(12) United States Patent
Goswami et al.

(10) Patent No.: US 6,582,730 B2
(45) Date of Patent: Jun. 24, 2003

(54) NATURAL FLUORESCENT DYE OBTAINED FROM A MARINE INVERTEBRATE, COMPOSITIONS CONTAINING THE SAID DYE AND THEIR USES

(75) Inventors: Usha Goswami, Goa (IN); Anush Ganguly, Goa (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/820,654

(22) Filed: Mar. 30, 2001

(65) Prior Publication Data

US 2002/0176895 A1 Nov. 28, 2002

(51) Int. Cl.[7] .................. A61K 35/12; A61K 35/56; A61K 35/32; C09B 1/00
(52) U.S. Cl. .................. 424/520; 424/547; 424/574; 435/4; 435/968; 8/648
(58) Field of Search .................. 424/520, 574, 424/547; 435/41, 968; 8/648

(56) References Cited

U.S. PATENT DOCUMENTS

| | | | |
|---|---|---|---|
| 4,016,133 A | | 4/1977 | Hyosu et al. |
| 4,452,822 A | | 6/1984 | Shrikhande |
| 5,210,275 A | | 5/1993 | Sabatelli |
| 5,321,268 A | | 6/1994 | Crosby et al. |
| 5,405,416 A | | 4/1995 | Swinton |
| 5,519,010 A | * | 5/1996 | Fan et al. |
| 5,858,761 A | | 1/1999 | Tsubokura et al. |
| 5,876,762 A | * | 3/1999 | Collin |
| 5,902,749 A | | 5/1999 | Lichtwardt et al. |
| 5,908,650 A | | 6/1999 | Lenoble et al. |
| 5,920,429 A | | 7/1999 | Burns et al. |
| 5,935,808 A | | 8/1999 | Hirschberg et al. |
| 5,989,135 A | | 11/1999 | Welch |
| 6,055,936 A | | 5/2000 | Collin |
| 6,056,162 A | | 5/2000 | Leighley |
| 6,110,566 A | | 8/2000 | White et al. |
| 6,140,041 A | | 10/2000 | LaClair |
| 6,165,384 A | | 12/2000 | Cooper et al. |
| 6,180,154 B1 | | 1/2001 | Wrolstad et al. |

FOREIGN PATENT DOCUMENTS

| | | |
|---|---|---|
| EP | 0 206 718 A2 | 12/1986 |
| WO | WO 90/10044 | 9/1990 |
| WO | WO 99/20688 | 4/1999 |
| WO | WO 99/38916 | 8/1999 |
| WO | WO 99/38919 | 8/1999 |
| WO | WO 00/58406 | 10/2000 |

OTHER PUBLICATIONS

Villela, G. The fluorescent pigment of *Holothuria grisea*. Rev. Brasil. Biol. 1951, vol. 11, pp. 33–36.*
Indap et al. Environ. Ecol. 1996. vol. 14, No. 4, pp. 917–919, LIFESCI Abstract enclosed.*
Anjaneyulu et al. Indian J. Chem. 1995. vol. 34, No. 7, pp. 666–668, SCISEARCH Abstract enclosed.*
Bitplace products (Fluorochrome). On the Internet (http://www.bitplane.ch/public/support/standard/Fluorochrome. htm), pp. 1–6.
Stainsfile—Dyes A; Gives Dye Index of 264 dyes, out of which only six are natural dyes from all types of living organisms. On the Internet (http://members.pgonline.com/~bryand/dyes/dyes.htm), pp. 1–8.
"Instruction BX–FLA Reflected Light Fluorescence Attachment", Olympus Optical Co. Ltd., Tokyo, Japan Catalogue, p. 16 (1999).
Clark, George L., "Pigments", Encyclopedia of Chemistry, 2nd Ed., pp. 833–837 (1966).
Clark, George L., "Fluorescence", Encyclopedia of Chemistry, 2nd Ed., pp. 435–436 (1966).
Sepčič, et al., "Anticholinesterase Activity Of The Fluorescent Zoanthid Pigment, Parazoanthoxanthin A", Toxicon, vol. 36, No. 6, pp. 937–940 (1998).
Shimomura, et al., "Extraction, Purification and Properties of Aequorin, a Bioluminescent Protein from the Luminous Hydromedusan, Aequorea", Journal of Cellular and Comparative Physiology, vol. 59, pp. 223–239 (1962).
Hobson, et al., "Green dyes", Journal of the Society of Dyers and Columnists (JSDC), vol. 114, pp. 42–44 (1998).

* cited by examiner

Primary Examiner—Christopher R. Tate
(74) Attorney, Agent, or Firm—Piper Rudnick LLP; Steven B. Kelber

(57) ABSTRACT

The present invention discloses the process of extraction, purification and characterization of a fluorescent dye from a marine echinoderm *Holothuria scabra*, compositions containing the dye and various applications of the dye.

36 Claims, 15 Drawing Sheets

(9 of 15 Drawing Sheet(s) Filed in Color)

16 FEB 2001 12:57:12
APPLICATION: SCANNING
TEST NAME:
DATA NAME: DEFAULT (0)
START WAVELENGTH: 300.0
STOP WAVELENGTH: 700.0
TIME: 0.0
TEMPERATURE: ----

WL: 379.0 nm    DATA: 0.188
16 FEB 2001 13:00:46
APPLICATION: SCANNING
TEST NAME:
DATA NAME: DEFAULT (0)
START WAVELENGTH: 300.0
STOP WAVELENGTH: 700.0
TIME: 0.0
TEMPERATURE: ----

WL: 439.0 nm    DATA: 0.276

NATURAL FLUORESCENT DYE OBTAINED FROM A MARINE INVERTEBRATE, COMPOSITIONS CONTAINING THE SAID DYE AND THEIR USES

FIELD OF THE INVENTION

The present invention relates to a novel fluorescent dye obtained from a marine animal invertebrate, Holothuria scabra. The present invention also provides a process for the extraction, purification, and characterization of this novel dye, which is a natural dye from marine invertebrate, especially the sea cucumber.

BACKGROUND OF THE INVENTION

Sea cucumbers are echinoderms, members of the group of spiny skinned animals that also includes Starfishes and sea urchins. The sea cucumber has the following taxonomic position:

Subkingdom: Metazoa
Phylum: Echinodermata
Sub-Phylum: Eleutherozoa
Class: Holothuroidea
Subclass: Aspidochirotacea, Dendrochirotacea, Apodacea
Order: Dendrochirota, Aspidochirota, Elasipoda, Molpadonia and Apoda Of these orders, the sea cucumber Holothuria scabra belongs to:

Order: Aspidochirota
Family: Holothuroidea
Genus: Holothuria
Species: scabra

Echinoderms are coelomate invertebrates which are exclusively marine, are never colonial, are unsegmented with a basic pentameric radial, are symmetrical in the adult form, have no head or brain, and are distinguished from all other animals by structural peculiarities of the skeleton and coelom. The class Holothuroidea has animals with a bilaterally symmetrical body and are usually elongated in the oral-aboral axis having a mouth at or near one end and an anus at or near the other end. The body surface is coarse. The endoskeleton is reduced to microscopic spicules or plates embedded in the body wall, the mouth is surrounded by a set of tentacles attached to a water vascular system, the podia or tube feet are usually present and locomotory, the alimentary canal is long and coiled and cloaca usually with respiratory trees and the sexes are usually separate and either gonad single or paired tuft of tubules. They are sedentary and either attach themselves to hard substrate or burrow into soft sediments with anterior and posterior ends projected. They occur in all seas, chiefly in shallow waters. A few species occur in depths greater than 1000 meters. The species Holothuria scabra, also called by some as Metriatyla scabra Jaegea, is widely distributed in East Africa, the Red Sea, the Bay of Bengal, East India, Australia, Japan, the South Pacific, the Philippines, the Indian Ocean, and other Indo-Pacific regions. It is used for human/animal consumption in Sabah, Malaysia and Indonesia and other Indo-Pacific countries.

Pigments are categorized as inorganic or organic. Inorganic pigments are inorganic chemistry compounds which are used for various decorative and painting purposes, etc. Organic pigments such as organic dyes date back to the ancient times. The use of dyes from plants like Brazil wood, long-wood, Persian berry indigo, and madder are reported from near east and far eastern countries even before Biblical times. (George L. Clark, 1966 "Encyclopaedia of Chemistry, $2^{nd}$ ed. Pages 833–835). Debra K. Hobson and David S. Wales describe "Green dyes" which are produced as secondary metabolites from some groups of living organisms like fungi, blue green algae, sea urchins, star fishes arthropods, and coral reef coelenterates. (Journal of the Society of Dyers and Colourists (JSDC), 114, 42–44, 1998). These are anthraquinone compounds, historically of crucial importance in the dyestuffs industry. Stainsfile—Dyes A gives a Dye Index of 264 dyes, out of which only six are natural dyes from all types of living organisms. (http://members.pgonline.com/~bryand/dyes/dyes.htm).

Recently, several patents have issued regarding natural dyes. A majority of them are from plants. Wrolstad, et al. describe a natural colorant from potato extract. (U.S. Pat. No. 6,180,154 issued on Jan. 30, 2001). Shrikhande disclosed the extraction and intensification of anthocyanins from grape pomace and other material. (U.S. Pat. No. 4,452,822 issued Jun. 5, 1984). Lenoble, et al. described a new composition to enhance the red color of anthocyanin pigment. (U.S. Pat. No. 5,908,650 issued Jun. 1, 1999).

Carotenoid-producing bacterial species are disclosed in two U.S. patents—U.S. Pat. No. 5,935,808 issued on Aug. 10, 1999 to Hirschberg, et al. and U.S. Pat. No. 5,858,761 issued on Jan. 12, 1999 to Tsubokura, et al. Collin disclosed sea cucumber carotenoid processing methods and compositions for lipid fractions. (U.S. Pat. No. 6,055,936 issued on May 2, 2000).

However, these colorants and dyes are not fluorescent. Fluorescent dyes, most of which are synthetic, are disclosed in several U.S. and International patents. These fluorescent dyes have been used in a variety of applications. The amount of patents in this field show the importance of these dyes.

Synthetic parazoanthoxanthin A (m.w. 214.2), emitting fluorescence at lambda (em) 420 nm, was found to be a pure competitive inhibitor of cholinesterases. Sepcic et al., Toxicon, 36(6):937–940, 1998. Welch disclosed a luminescent golf ball. (U.S. Pat. No. 5,989,135 issued on Nov. 23, 1999). White et al. (U.S. Pat. No. 6,110,566 issued on Aug. 29, 2000 and International Patent WO/9920688) described a flexible polyvinyl chloride film that exhibits durable fluorescent color.

Dipietro disclosed the use of fluorescent polymeric pigments in a variety of paints, inks, and textiles. (International Patent WO/9938916). Cramer described a composition containing fluorescent dye for bleaching and brightening polymers. (International Patent EP0206718).

Fluorescent leak detection dye is another utility disclosed by some skilled in the art. (U.S. Pat. No. 6,056,162 issued on May 2, 2000 to Leighley). In addition, Cooper et al. disclosed a full spectrum fluorescent dye composition for the same purpose. (U.S. Pat. No. 6,165,384 issued on Dec. 26, 2000).

Lichtwardt et al. disclose the use of a fluorescent dye in an automated chemical metering system. (U.S. Pat. No. 5,902,749 issued on May 11, 1999).

The reports from marine animals are few. A green fluorescent protein GFP, a novel reporter gene, has been described from the pacific jellyfish Aequova aequora. (Shimomura, et al., Journal of Cellular and Comparative Physiology, 59, 223–239, 1962). GFP is characterized by the presence of a highly fluorescent chromatophore. Purified GFP absorbs blue light maximally at 395 nm with a minor peak at 470 nm and also emits green light. Sepcic et al. reported a fluorescent zoanthid pigment, parazoanthoxanthin A. Toxicon, 36(6):937–940, 1998.

Marine dyes have several uses as dyes on their own and as a part of compositions.

Several authors have disclosed fluorescent dye blends for multiple purposes. (E.g., Burns, et al. in U.S. Pat. No. 5,920,429 issued on Jul. 6, 1999 and Burns, et al. International Patent AU/704112). Marine dye compositions have been used in a number of applications to mark the location of crashed aircraft, life rafts, and military equipment (e.g., rockets). The dye commonly used is fluorescein, which is a water-soluble synthetic dye. Different compositions of the dye for better efficiency and longer duration of fluorescence in diluted form are under trials. (Swinton Robert J., U.S. Pat. No. 5,405,416 issued on Apr. 11, 1995 and International Patent WO/9010044 published on Jul. 7, 1990). Hyosu, et al. has prepared fluorescent colored resin particles. (U.S. Pat. No. 4,016,133 issued on Apr. 5, 1977).

Another use of marine dyes as undersea probes is reported by Crosby, et al. in U.S. Pat. No. 5,321,268 issued on Jun. 14, 1994. The probe device described includes a central optical fiber containing a fluorescent dye enclosed in a transparent or translucent, protective and fouling resistant sheath. This sheath can be attached to a marine animal for collecting data as to light intensity and temperature in regions where the marine animals travel.

Some authors have used UVA in photochemotherapy for skin cancers. Kowalzick, et al. disclose PUVA-bath photochemotherapy in lymphomatoid papulosis (a skin cancer) where UVA treatment has shown improvement. (Elsevier Science B. V., 2000). UVA sunbeds are widely used by patients with psoriasis.

In U.S. Pat. No. 5,210,275 issued on May 11, 1993, Sabatelli disclosed a chromatophore sunscreen composition for preventing sunburns. The chromatophore had the ability to absorb UVA and UVB wavelength radiations.

Fluorescent dyes are very useful in the labeling of molecular probes for fluorescence microscopy. Fluorescence microscopy, also known as reflected light fluorescence or epifluorescence microscopy, is of great value for non-radioactive in situ hybridization because of its high sensitivity and ability to excite three different immunofluorophores with spectrally separated emissions. This makes multiple detections possible. (Chapter II, Nonradioactive In Situ Hybridization Application Manual, Boehringer Mannheim GmbH, Biochemica, printed in Germany, 1992). The principle behind this is that when the specimen is irradiated by the excitation wavelength corresponding to Stoke's Law, which explains that the wavelength of the fluorescent radiation is always longer than that of the excitation radiation. (Clark, George, "Fluorescence", Encyclopaedia of Chemistry, $2^{nd}$ ed., pages 435–436, 1966; Chapter V, In Situ Hybridization Application Manual, Boehringer Mannheim GmbH, Biochemica, printed in Germany, pages 23–62, 1992; and Olympus Optical Co. Ltd, Tokyo, Japan. Catalogue, "Instructions BX-FLA Reflected Light Fluorescence Attachment", page 16, 1999 (described variety of non-radioactive fluorochrome stains in use)).

Different stains are used for different excitation cubes of the fluorescent microscope. For example, DAPI (DNA staining, emits blue color), Fluorescein—dUTP; Hoechest 33258, 33342 are seen under excitation with 330–385 excitation cubes; FITC, Acridine Orange (for DNA, RNA emits greenish/yellowish hues), Auramine under 450–480 excitation cube and Rhodamine, TRITC and Propidium iodide (DNA, emits orange hues) under 510–550 excitation cube.

Rosenblum, et al. used a set of 4,7-dichlororhodamine compounds useful as fluorescent dyes as molecular probes in International Patent WO/0058406 published on Oct. 5, 2000.

LaClair disclosed the synthesis of a fluorescent dye and its application in protein labeling, DNA labeling, single molecule spectroscopy and fluorescence. (U.S. Pat. No. 6,140,041 issued on Oct. 31, 2000 and International Patent WO/9938919).

The present invention adopts a different approach. In particular, the dye disclosed in the present invention is a natural dye and not synthetic. It is from a marine animal and not from a plant or microbes. The partially pure dye is extracted from the cells of the skin of the invertebrate directly. This is a first report for a natural dye from a marine animal which is a fluorescent dye. The marine animal source a holothurian, namely a sea cucumber called *Holothuria scabra*. Unlike most other fluorescent synthetic dyes known, the dye according to the present invention does not need to be mixed with another dye to obtain different fluorescence hues at different wavelengths. It emits three different colored fluorescence at three different excitation wavelengths, which can have multiple uses. Further, even among the naturally known fluorescent dyes such as the most popular green fluorescent protein (GFP) from a jelly fish, the dye according to the present invention is non-proteinaceous in nature and is more stable at room temperature for months and does not get contaminated by microbes. It also has qualities of a biosurfactant. Another important feature of the dye is that after excitation in the lower UV spectral ranges of wavelengths (UVB), it emits fluorescence in the UVA wavelength range. Both these absorption and emission ranges can be put to selective applications depending upon which UV spectra is preferable in a particular situation.

One important aspect of the dye is its making compositions and kits for non-radioactive labeling of molecular probes and counterstaining. At different wavelength excitations, it gives the effect equivalent to the color of DAPI, FITC and PI. Three in one though it is a single dye. This single dye covers the colors of wavelength spectrum of 123 fluorochromes presently known in the market. (See Bitplane products (Fluorochrome) on the internet at http://www.bitplane.ch/public/support/standard/Fluorochrome.htm).

Yet another aspect of this dye is its use as a fluorochrome stain in epifluorescence microscopy, which is reported here for the first time for any marine natural dye. This application provides a simple and quick method of checking cytogenetical preparations for multiple uses like molecular diagnostics using fluorescent in situ hybridization techniques, rapid diagnosis of biocontamination in tissue cultures, industrial preparations, and water quality check both in laboratory and in wild conditions.

Yet another aspect of the dye is its use as a component of non-radioactive labeling kits for advanced molecular biology applications.

SUMMARY OF THE INVENTION

The main object of the present invention is to provide a novel fluorescent dye obtained from the sea cucumber *Holothuria scabra*.

Another object of the present invention is to provide a process for the extraction, partial purification, and characterization of the natural dye/pigment form the marine animal *Holothuria scabra*.

Yet another object of the present invention is to provide compositions employing the dye obtained from the tissues of *Holothuria scabra*.

Yet another object of the present invention is to provide compositions employing the dye obtained from the tissues of *Holothuria scabra*.

Yet another object of the present invention is to observe its insecticidal and pesticidal effects.

Yet another object of the present invention is its application for veterinary remedies.

Still another object of the present invention is to provide a dye that emits fluorescence in three different wavelength ranges of the UV and visible light spectra on particular excitation wavelengths.

Another object of the present invention is to obtain and observe the fluorescence and visible spectroscopic analysis and range of emission wavelengths.

Yet another object of the present invention is to observe the three different fluorescence colored emissions of the dye in the UV and visible ranges of epifluorescence microscopy cubes.

Still another object of the present invention is to observe the effect of fluorescence staining of cytogenetical slides to screen chromosomes, cells, and tissues by using the dye of the present invention.

Yet another object of the present invention is biosurfactant nature analysis.

Still another object of the present invention is to develop kits containing the fluorescent dye as a non-radioactive label for molecular probes.

In sum, the present invention provides a novel fluorescent dye obtained from the sea cucumber *Holothuria scabra*. The invention includes a process for extraction, isolation, and characterization of the dye. Further, the invention provides compositions containing the dye.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
FIG. 1 is a photograph of a sea cucumber *Holothuria scabra* from the field before extraction of the dye.

After much research, a novel fluorescent dye obtained from marine animals, in particular from invertebrates, and more specifically from the sea cucumber *Holothuria scabra* has now been identified.

Subkingdom: Metazoa
Phylum: Echinodermata
Sub-Phylum: Eleutherozoa
Class: Holothuroidea
Subclass: Aspidochirotacea
Order: Aspidochirota Among these orders, the sea cucumber *Holothuria scabra* belongs to:

Order: Aspidochirota
Family: Holothuroidea
Genus: Holothuria
Species: *scabra*

The invention provides a novel fluorescent dye which is obtained from the skin of the animal. The present invention also describes the physical and chemical nature of the dye and its stability in direct light and high and low temperatures. The dye has three colored fluorescent emissions at three different excitation wavelengths in the UV and visible light spectrum. The invention also relates to screening of cells under a fluorescence microscope for a rapid check of contamination and cytogenetical screening. The invention is also concerned with the uses of the dye as a non-radioactive label of protein, DNA and RNA molecular probes for advanced molecular diagnostics, in epifluorescence microscopy for single and double staining of chromosomes, cells and tissues, in fluorescence in situ hybridization applications, as a biosurfactant, as a biocontamination and leakage check, in photochemotherapy, in novel remote sensing devices, in underwater probes, in life saving devices, to mark the location of crashed aircraft, in life rafts and military equipment, for example, rockets, in various fluorescence applications in sub zero temperature conditions, and many more applications.

The invention discloses and describes a fluorescent dye obtained from marine animals which either absorb sunlight for their physiological functions or are exposed to longer durations of sunlight and appear to have evolved mechanisms of fluorescence at different wave lengths. Like the phytoplankton, picoplankton and photosynthetic bacteria absorb sunlight for their photosynthetic functions, the required wavelengths of light spectra are used in the chemical pathways and any extra light is emitted according to Stoke's law.

The invertebrate animals who do not have extra outer armor like a shell or conspicuous defense organs, who have hard and spiny skin, who have a strong endoskeleton formed of ossicles, are sedentary or have slow mobility, have long hours of exposures to direct sunlight, or live in sand or crevices may show fluorescence.

The present invention seeks to overcome the drawbacks inherent in the prior art by providing highly efficient and selective methods for extraction, purification, and characterization of a dye from a marine invertebrate and its multiple uses in making kits for molecular diagnostics using non-radioactive labels, as molecular markers, in epifluorescence microscopy, in photochemotherapeutics, as a component of new instrumentation devices for land and underwater probes, in the cosmetic industry, in the food industries, and in the armed forces, etc.

The marine invertebrate utilized in the present invention is an echinoderm taxonomically called *Holothuria scabra* belonging to the class Holothuroidea. The product of the invention is a novel dye. The animals were collected from the shores of the central west coast of India during low tide, brought to the laboratory and maintained in glass tanks containing sea-water of salinity 30–32% per par. The animals were adults and sexually mature. The taxonomic position was identified as set forth above. Most of the dyes available are synthetic in nature. In fact, there are only 6 types of natural dyes, including dyes obtained from all living organisms. The fluorescent dye reported in the present invention is the only one of its kind from marine organism.

As used herein, the term "dye" is used to describe a pigment which does not get decolorized by a reducing agent. The dye imparts color to fibre, cellulose, etc. It is called a natural dye because the source is from a marine animal found commonly in nature along shores of the world and is not a synthetic pigment. A "fluorescent dye" is a dye which on excitation at a particular wavelength, during the transition from a higher to the lower electronic state within a very short duration, it emits light.

"Multiple colored fluorescence" means the emission of different colored light when excited at different ranges of wavelengths. It emits blue, yellow, and orange colored hues of fluorescence at excitations with different spectra of UV and visible light. "Biosurfactant" means a dye solution which if shaken provides a foam-like soap and shows anti-microbial quality. Molecular diagnostics as used herein means the use of the dye as a non-radioactive label of molecular probes for fluorescent in situ hybridization, applications in molecular cytogenetics, and as markers in microarrays and molecular biological studies. Epifluorescent microscopy pertains to the microscopic studies of cytogenetical preparations of slides by using the present dye as a stain and recording different colored fluorescence when observed under different cube configurations and emits a particular colored emission on excitation with known fluorochromes. The fluorochrome cubes WUB, WB, WG are the designated filter cube configurations of the Olympus BX-FLA reflected light fluorescence attachment for different wavelengths.

Accordingly, the present invention provides a method for extraction, purification, and characterization of a natural fluorescent dye which includes:

(i) collection of the animal from field and maintenance in the laboratory conditions, (ii) extraction of the pigment from the skin of the echinoderm sea cucumber *Holothuria scabra*, and (iii) partial purification of the dye.

The bioactive extract according to the present invention is obtained from the marine sea cucumber *Holothuria scabra*. This extract is useful as a natural fluorescent dye and has the following characteristics:

i. decolorization by a reducing agent,
ii. not a synthetic compound,
iii. crude extract of the dye is yellowish-green in color,
iv. partially purified dye is a reddish brown colored powder when seen with the naked eye in the daylight,
v. under tube light some hues of green are emitted,
vi. amorphous in nature,
vii. soluble in water,
viii. insoluble in the organic solvents like ethanol, methanol, and acetone,
ix. is negatively charged,
x. has a pH of 6.
xi. presence of a phenolic group,
xii. absence of a quinonoid ring,
xiii. absence of aromatic amine groups,
xiv. non-proteinaceous in nature
xv. reducing sugar is absent,
xvi. dye has nature of a biosurfactant,
xvii. dye showed antimicrobial qualities and when antimicrobial assay was performed, showed zone of inhibition,
xviii. pigment cum dye is a fluorescent dye and emits fluorescence when excited with different wavelengths of UV and visible spectral ranges on a spectrophotometer,
xix. UV, visible spectroscopy from 300 nm–700 nm and the peaks are marked at 379 nm and 439 nm wavelengths,
xx. UV, visible spectroscopy from 250 nm–350 nm and the peaks are at 272 nm and 299 nm wavelengths,
xxi. fluorescent spectroscopy in the UV and visible spectra, when excited with UV 270 nm wavelength, the fluorescence is emitted in the 324 nm–380 nm range, which is under the UVA wavelength range of ultraviolet rays of the sun, xxii. with excitation wavelength of 450 nm in fluorescent spectroscopy the fluorescence emission occurred at 500 nm–580 nm with maximum intensity, xxiii. with excitation wavelength of 540 nm in fluorescent spectroscopy, the fluorescence emission occurred at 500 nm–620 nm with maximum intensity, xxiv. with excitation wavelength of 555 nm in fluorescent spectroscopy, the fluorescence emission occurred at 575 nm–620 nm with maximum intensity, xxv. physical checking of Whatman Filter no. 1 dipped with dye concentration 1:40000 dilution under UV transilluminator and Gel Documentation system with UV bulbs in the 260 nm–280 nm range emit bluish green hue color of fluorescence, xxvi. emits three different colored fluorescence at three different wavelengths of the UV and visible ranges of the fluorescent cubes of an epifluorescence microscope, xxvii. fluorescence blue color emission occurs in the 380 nm–400 nm range of UVA when excited under an ultra violet cube WU-330 nm–385 nm excitation range, xxviii. fluorescence yellow color emission occurs in the 500 nm–570 nm range when excited under WB cube of 450 nm–480 nm excitation range, xxix. fluorescence orange color emission occurs in the 570 nm–650 nm range when excited under WG cube of 510 nm–550 nm excitation range, xxx. the dye emits hues of grays under the ordinary transmitted light bulb of the epifluorescence microscope when seen under 10×objective, xxxi. the dye emits these fluorescence colors even at a dilution range of 1:40000 times (i.e., 1 gm powder of dye dissolved in 40 liters of ultrapure water), xxxii. the fluorescence of the extract persists even after at least 1 year at room temperature, xxxiii. the fluorescence of the dye is highly photostable and does not get deteriorated by long exposures to direct light, and xxxiv. the fluorescent of the dye does not change even when frozen at 20° C., a temperature at which the molecules are unable to attain the energy necessary for activation like in extracts from luminescent organisms.

Physical and other characteristics of the dye may be assessed by the following steps:

(i) structural analysis of the dye, (ii) biosurfactant analysis, (iii) antimicrobial test, (iv) visible spectroscopy of the dye, (v) fluorescence spectroscopy of the dye, (vi) physical checking of emission under a UV transilluminator in the 260–280 mn range, (vii) preparation of the cytogenetic slides by an air dried method, (viii) staining slides with the dyes, (ix) epifluorescent microscopic screening of the cytogenetic slides under fluorochrome cubes WU, WB, WG and Bright field, (x) microphotography of emitted fluorescence in the areas of slides without any cytogenetic material, (xi) microphotography of emitted fluorescence of the cytogenetic slides under fluorochrome cubes WU, WB, WG and Bright field, and (xii) checking of wavelength ranges of the fluorescent hues of emission and wavelength ranges of the excitation ranges of fluorochrome cubes.

Thus, the invention provides a natural fluorescent dye of marine animal origin which emits three different colored fluorescence in the hues of blue, yellow, and orange when excited with three different ranges of wavelengths in the UV and visible light spectral cubes of an epifluorescence microscope. The invention further relates to the peaks of emission at nearly the same ranges of excitation wavelengths by recording readings of a fluorescence spectrophotometer and the visible light spectrophotometer respectively. The invention further relates to the epifluorescence microscopy of cytogenetic material on air dried preparations by using this dye as the epifluorescent microscopic stain. This dye could be used in making non-radioactive labeling kits for molecular diagnostics by fluorescent in situ hybridization in various molecular, biomedical, and engineering science.

In one embodiment, the source of the dye is an invertebrate marine animal belonging to SubKingdom: Metazoa, Phylum: Echinodermata, Subphylum: Eleutherozoa, Class: Holothuroidea, Name: *Holothuria scabra*.

In yet another embodiment, the *Holothuria scabra* is a sea cucumber which is widely distributed in the shores, shallow waters, and deep waters all over the world, particularly the Indo-Pacific. The nearest well-known relatives of the sea cucumber are sea urchins and star fishes.

In yet another embodiment, the skin of *Holothuria scabra* is separated and weighed. To 15 gms of skin by wet weight, 250 ml of 50% alcohol is added and filtered under vacuum by using a peristaltic pump working at the rate of 200 rpm.

In yet another embodiment, the extract is evaporated to one third of its volume by keeping the extract on a water bath at 80° C. and concentrating it from 250 ml to 80 ml. It takes about 3 hours of duration for evaporation.

In yet another embodiment, 100 ml ethanol (99.5%) is added to 80 ml of the concentrate of the extract and allowed to precipitate overnight.

In yet another embodiment, the concentrate with the precipitate is centrifuged at 1500 rpm for 4–5 minutes and the top layer is decanted. The precipitate is then evaporated to dryness on a water bath at 80° C. for 5 minutes. 250 ml of 50% ethanol extract provide 2.5 gms of dye on evaporation.

In yet another embodiment, the partially pure dye is scooped out with the help of a spatula and stored in a dry glass vial at room temperature.

In another aspect, the physical nature of the dye is recorded. The pure dried dye is reddish-brown in color in daylight. Under tube light, a hue of green is observed. The dye is soluble in water and insoluble in organic solvents such as pure ethanol, methanol, chloroform, and acetone. It is amorphous in nature and has a pH of 6.5 in an aqueous solution.

In yet another aspect, structural analysis was done by a chemical method. The dye is dissolved in distilled water at 2 mg/ml and checked for chemical nature.

In yet another embodiment, neutral ferric chloride was added and purple coloration was observed. This proved that a phenolic group is present.

In another embodiment a β-mercaptoethanol reducing agent was added. No decoloration of the compound occurred. This proved that a quinonoid ring is absent and that the pigment is a dye.

In another embodiment diazotization was done by adding 0.1 N HCl and $NaNO_2$ (Sodium nitrite) and an alkaline solution of β-naphthol was added to it. No precipitation was observed. This proved the absence of an amine group.

In another embodiment, the concentrated dye solution at 10 mg/ml was heated. No precipitation or coagulation was observed. This proved that the compound is non-proteinaceous in nature. To the same solution, a drop of concentrated HCl and Fehling's solution was added. No color change proved that a reducing sugar is absent.

In another embodiment, the biosurfactant nature of the dye was observed by its making a foam when added to water and shaken.

In another embodiment, the antimicrobial disc test was performed and the zone of inhibition was observed.

The nature of the dye was studied and it was determined that it gave multicolored emissions at different wavelengths of excitations which are comparable to fluorochrome microscopic stains already in the market. The blue colored fluorescence of the present dye is comparable to the emission of the same color by DAPI fluorochrome at the same wavelength excitation, which is used as components of the non-radioactive labeling kits of biochemistry, cell biology, immunochemistry, and molecular biology. The yellow colored fluorescence of the dye in the visible range is comparable to the same colored emissions of auramine which is used as components of the non-radioactive labeling and detection kits of biochemistry, cell biology, immunochemistry, and molecular biology. The yellow colored fluorescence of the dye in the visible range is comparable to the same colored emissions of FITC which is used as components of the non-radioactive labeling and detection kits of biochemistry, cell biology, immunochemistry, and molecular biology. The orange colored fluorescent emission of the dye is comparable to the orange fluorescence color of propidium iodide fluorochrome which is used as components of the non-radioactive labeling and detection kits of biochemistry, cell biology, immunochemistry, and molecular biology. The dye according to the present invention is stable at room temperature and has a long shelf life. Molecular and radioactive kits of the dye can be exported at room temperatures. The dye has characteristics of at least one hundred and twenty three different fluorochromes, namely DAPI, Hoechest 33258, Hoechest 33342, FITC, acridine orange, auramine, Rhodamine, TRITC, and propidium iodide, which are now in the market. The dye, under the ordinary light of a microscope, the hues of grays produce a phase contrast effect which is useful in rapid screening of cytogenetical, cytological, and histochemical slides and save expenses on the extra phase contrast accessory component of microscope. The fluorescence color emissions follow Stoke's law of fluorescence. Microphotographs with Kodak film rolls show hues of adjacent color emission wavelengths such as blue color fluorescence under the epifluorescence microscope and hues of green in a microphotograph. The microphotographs with Kodak film rolls also show hues of adjacent color emission wavelengths like yellow color fluorescence under the epifluorescence microscope, in microphotograph hues of green are also seen. The orange fluorescence color is seen under the epifluorescence microscope, in microphotograph, hues of red are also seen. The cytogenetic slides seen for fluorescence gives a counterstain effect of cells with the background where no specimen but only dye is present.

Figure 3A:
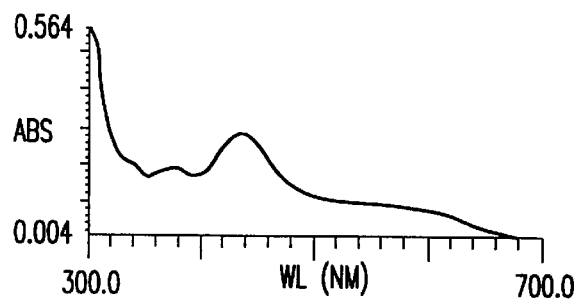
FIGS. 3A–3C are graphical illustrations of UV visible spectroscopy of the extract from 300 nm–700 nm.
Figure 3B:
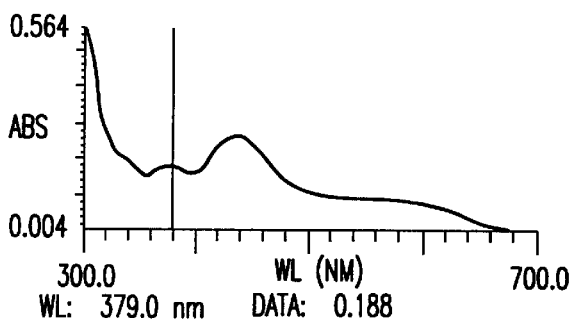
Figure 3C:
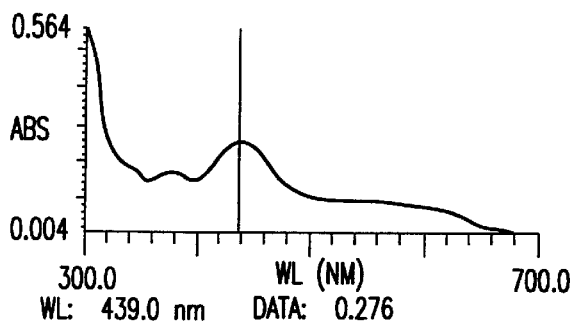

In another embodiment, UV visible spectroscopy from 300 nm–700 nm wavelength was performed. (See FIGS. 3A–3C). The peaks are marked at 379 nm and 439 nm wavelengths.

Figure 4A:
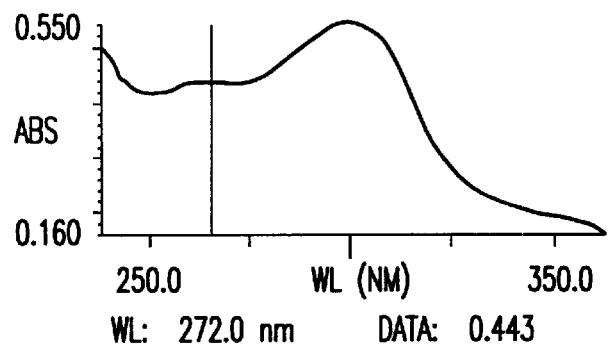
FIGS. 4A–4B are graphical illustrations of UV visible spectroscopy of the extract from 250 nm–350 nm.
Figure 4B:
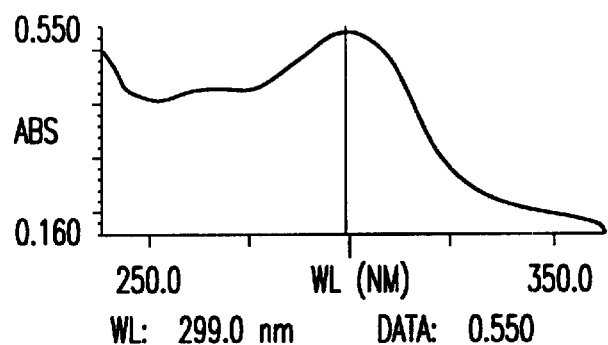

In another embodiment, UV spectroscopy from 250 nm–350 nm wavelength was performed. (See FIGS. 4A–4B). The peaks are marked at 272 nm and 299 nm wavelengths.

Figure 5:
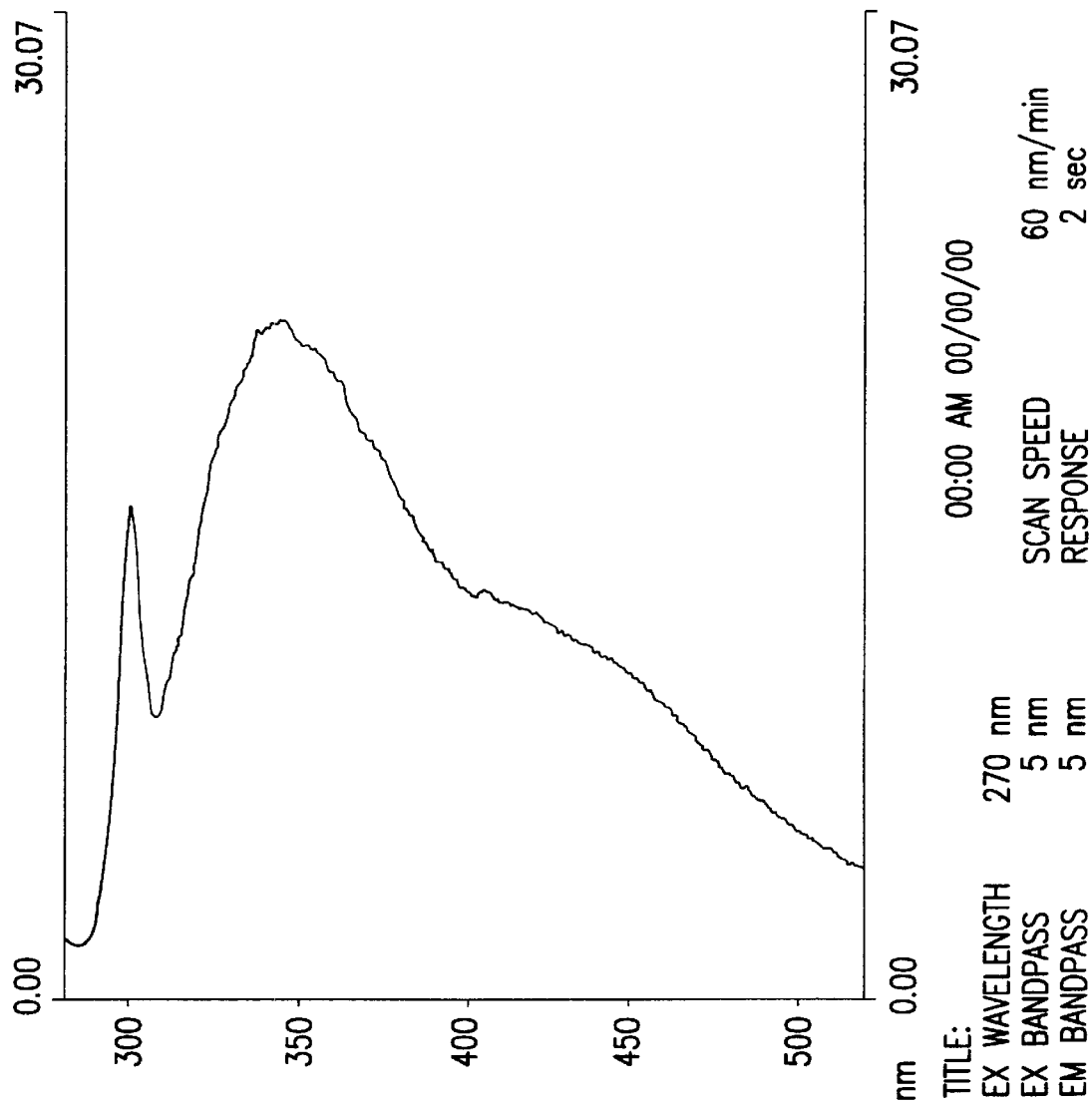
FIG. 5 is a graphical illustration of fluorescence spectroscopy of the extract at an excitation wavelength of 270 nm.

In yet another embodiment, fluorescence spectroscopy was conducted at an excitation wavelength of 270 nm. Fluorescence occurred in the range of 324 nm–380 nm, with maximum intensity. (See FIG. 5).

Figure 6:
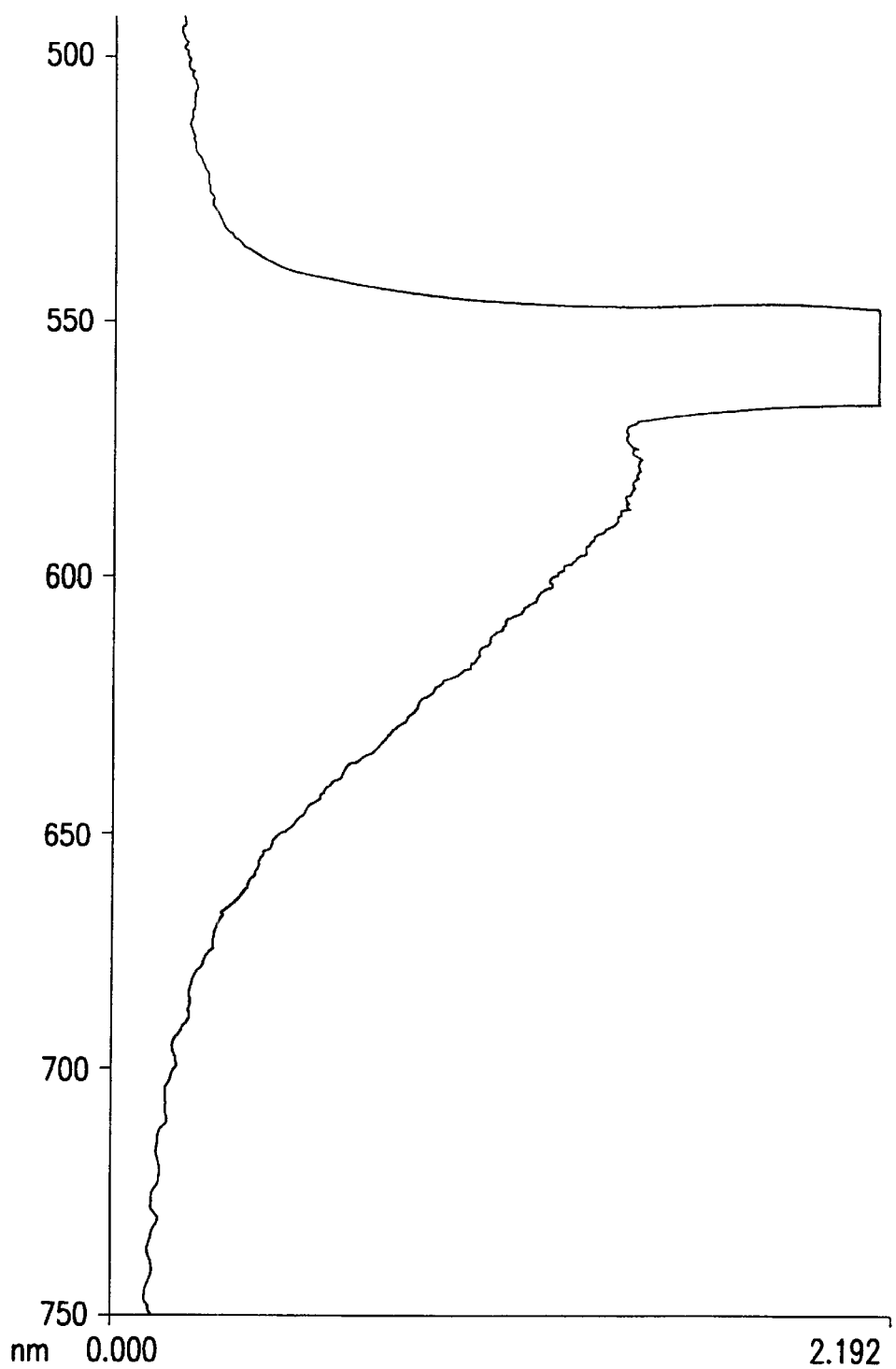
FIG. 6 is a graphical illustration of fluorescence spectroscopy of the extract at an excitation wavelength of 450 nm.

In another embodiment, fluorescence spectroscopy was conducted at an excitation wavelength of 450 nm. Fluorescence occurred in the range of 500 nm–580 nm, with maximum intensity. (See FIG. 6).

Figure 7:
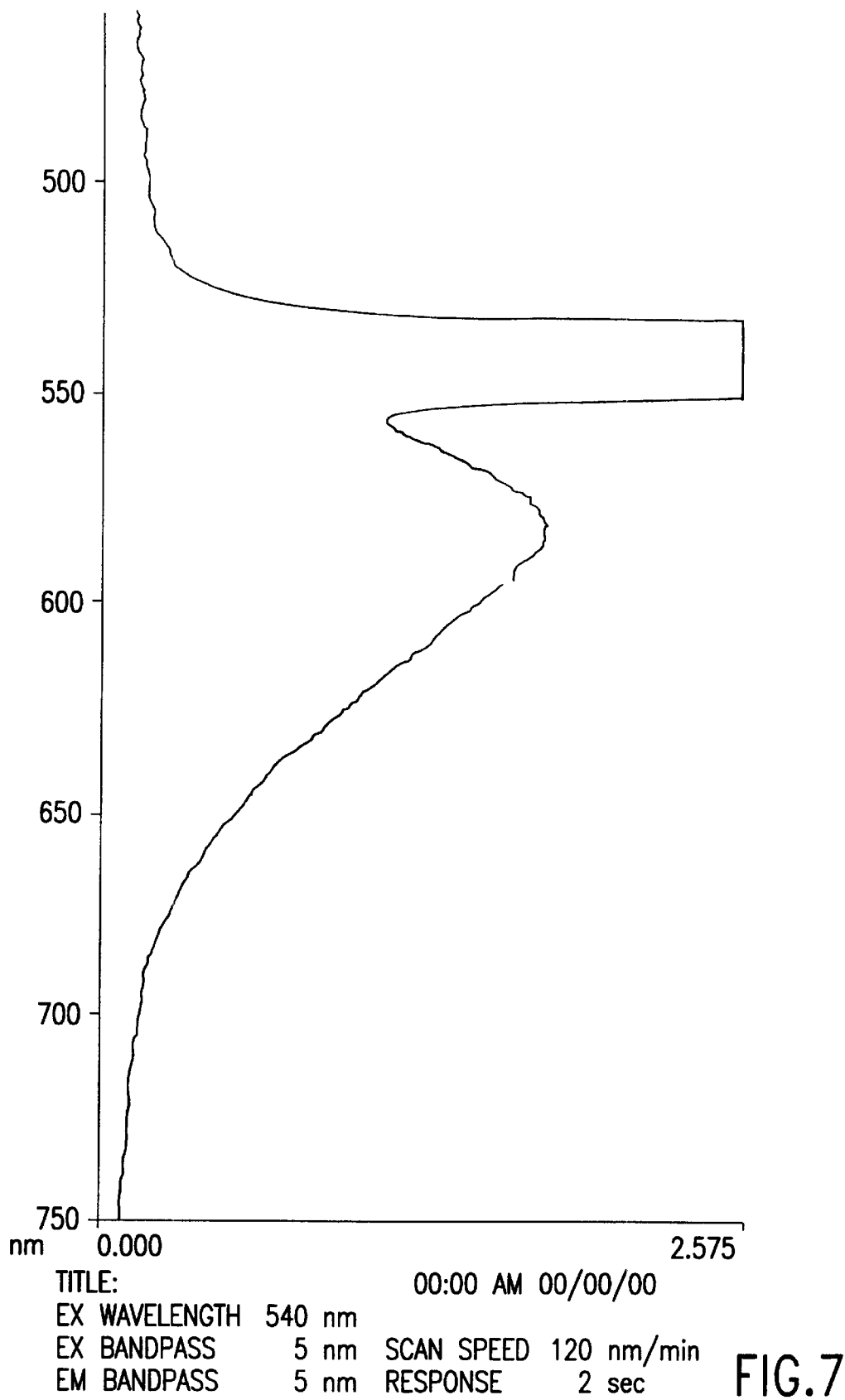
FIG. 7 is a graphical illustration of fluorescence spectroscopy of the extract at an excitation wavelength of 540 nm.

In another embodiment, fluorescence spectroscopy was conducted at an excitation wavelength of 540 nm. Fluorescence occurred in the range of 500 nm–620 nm, with maximum intensity. (See FIG. 7).

In another embodiment, fluorescence spectroscopy was conducted at an excitation wavelength of 555 nm. Fluorescence occurred in the range of 575 nm–620 nm, with maximum intensity. (See FIG. 8).

Figure 9:
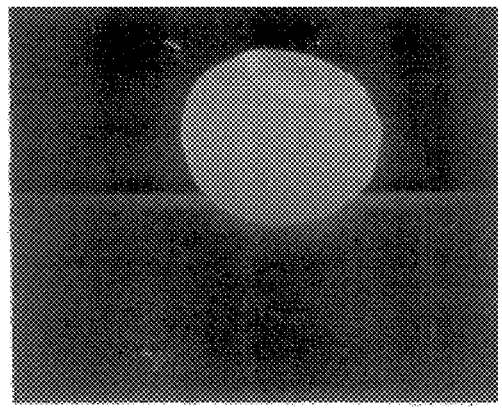
FIG. 9 is a photograph of filler paper soaked in the extract and observed under UV radiation.
Figure 10:
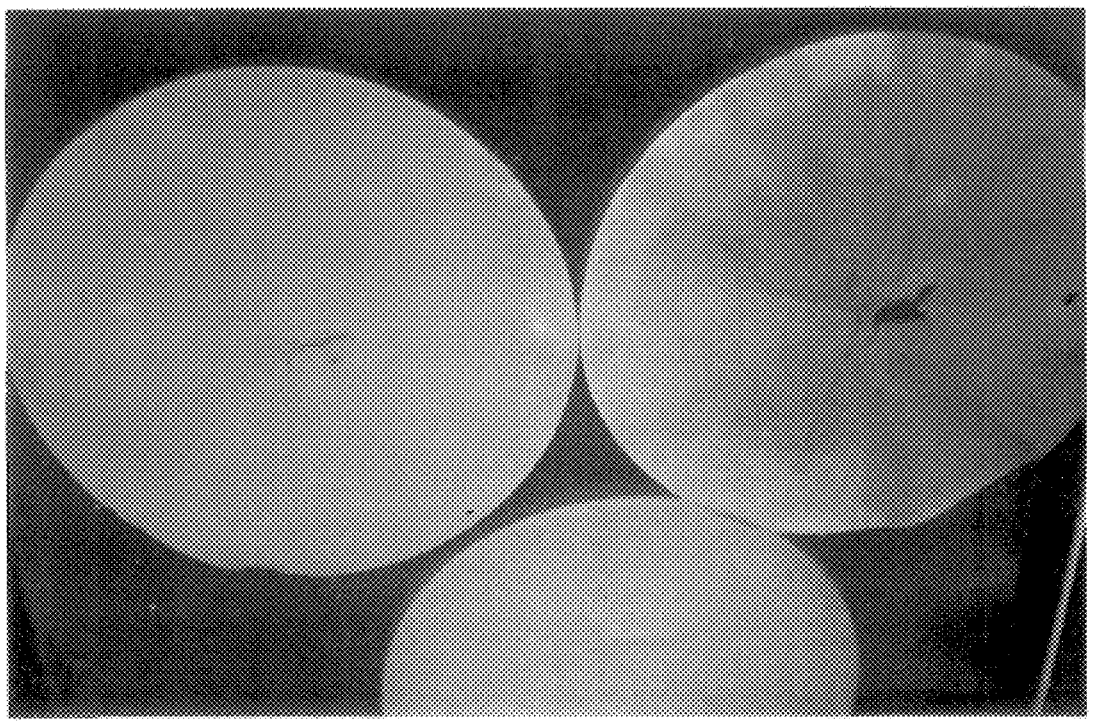
FIG. 10 is a photograph of filter papers used for filtration of the extract and observed under a UV transilluminator at 260 nm–280 nm.
Figure 11:
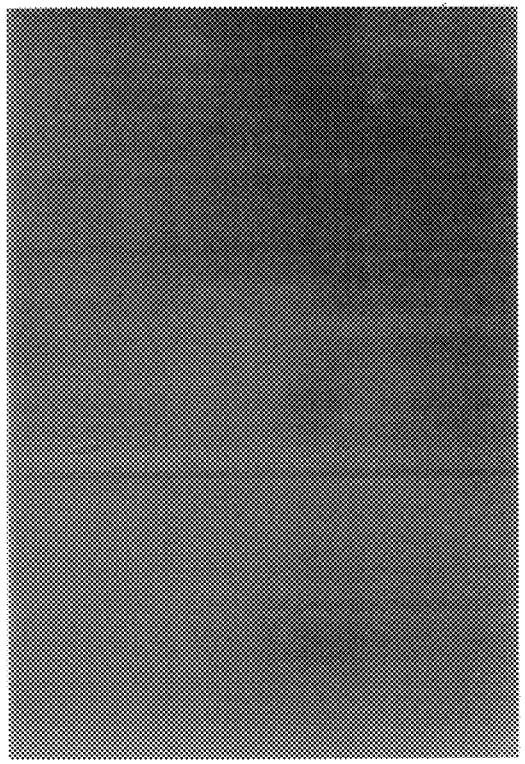
FIG. 11 is a photograph of the epifluorescence microscopic emissions with a WV cube having an excitation range of 350 nm–385 nm without any specimens.
Figure 12:
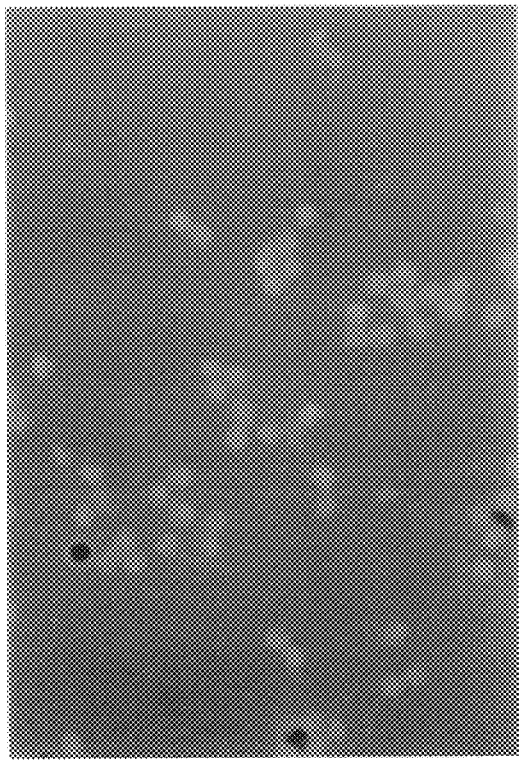
FIG. 12 is a photograph of the epifluorescence microscopic emissions with a WV cube having an excitation range of 350 nm–385 nm with cells seen under a 10×objective lens.
Figure 13:
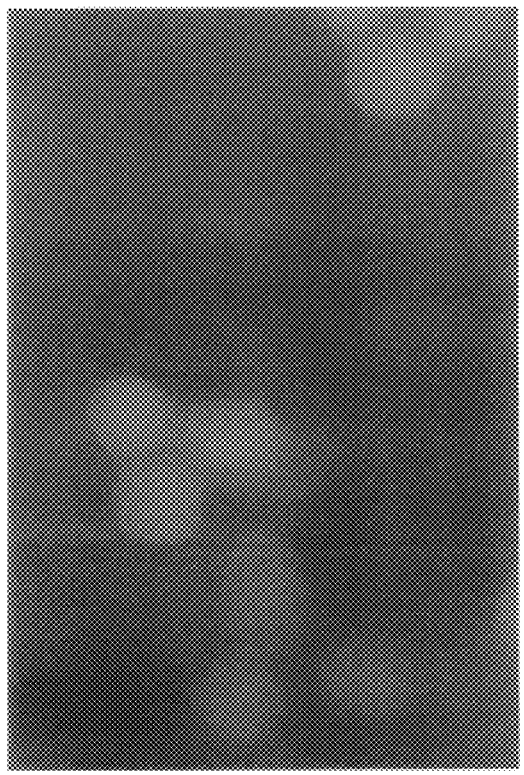
FIG. 13 is a photograph of the epifluorescence microscopic emissions with a WV cube having an excitation range of 350 nm–385 nm with cells seen under a 40×objective lens.
Figure 14:
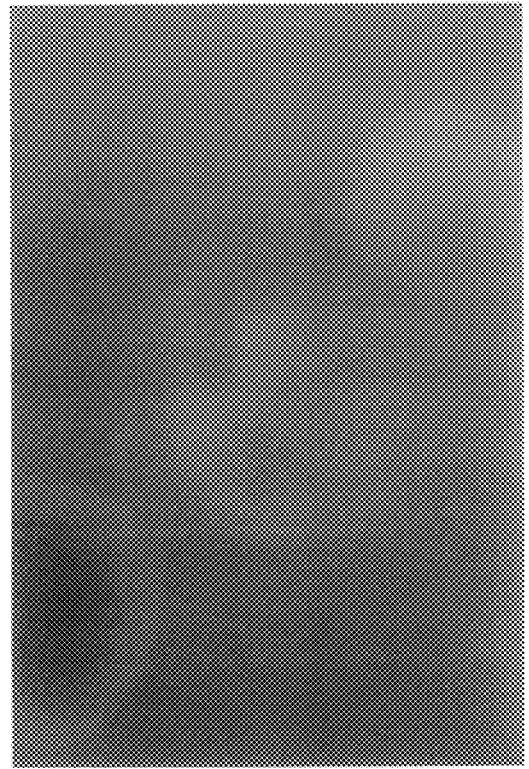
FIG. 14 is a photograph of the epifluorescence microscopic emissions with a WV cube having an excitation range of 350 nm–385 nm with cells seen under a 100×oil immersion objective lens.
Figure 15:
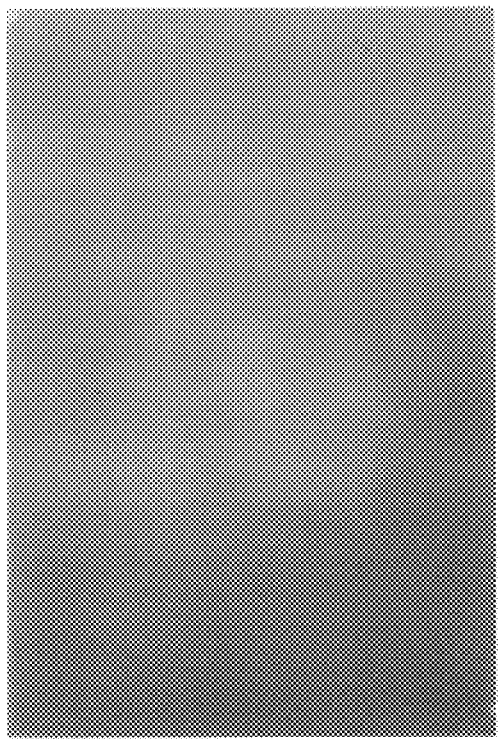
FIG. 15 is a photograph of the epifluorescence microscopic emissions with a WB cube having an excitation range of 450 nm–480 nm without any specimens.
Figure 16:
FIG. 16 is a photograph of the epifluorescence microscopic emissions with a WB cube having an excitation range of 450 nm–480 nm with cells seen under a 40×objective lens.
Figure 17:
FIG. 17 is a photograph of the epifluorescence microscopic emissions with a WB cube having an excitation range of 450 nm–480 nm with cells seen under a 100×oil immersion objective lens.
Figure 18:
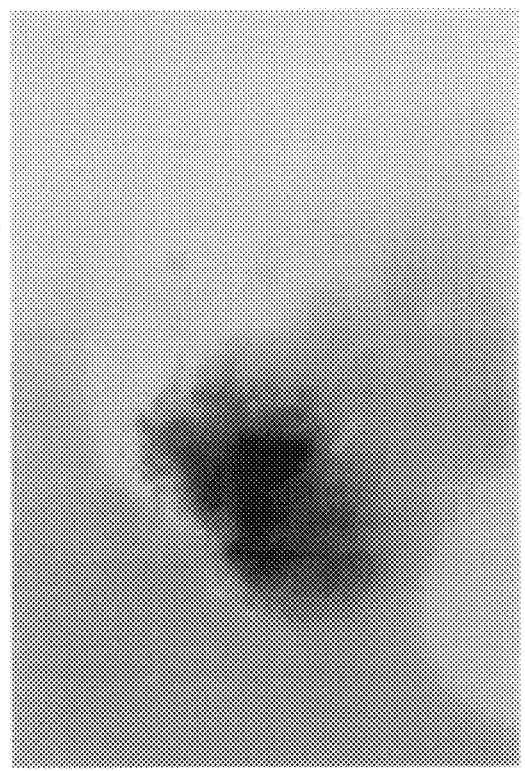
FIG. 18 is a photograph of the epifluorescence microscopic emissions with a WB cube having an excitation range of 450 nm–480 nm with cells seen under a 100×oil immersion objective lens.
Figure 19:
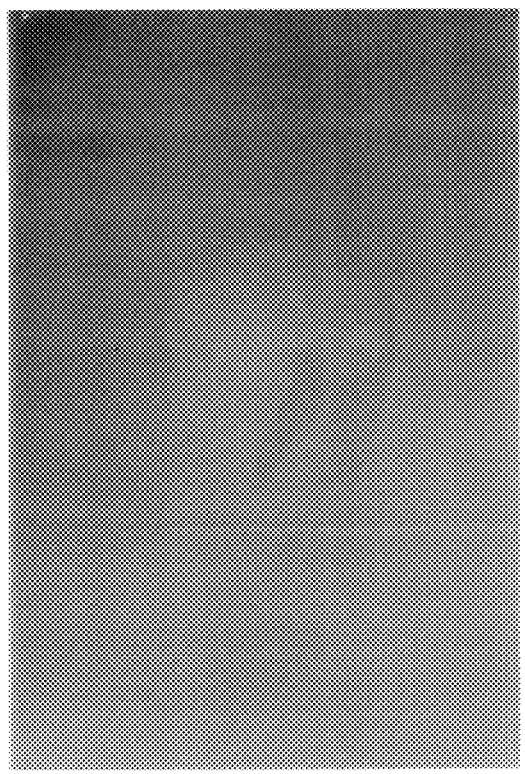
FIG. 19 is a photograph of the epifluorescence microscopic emissions with a WG cube having an excitation range of 510 nm–550 nm without any specimens.
Figure 20:
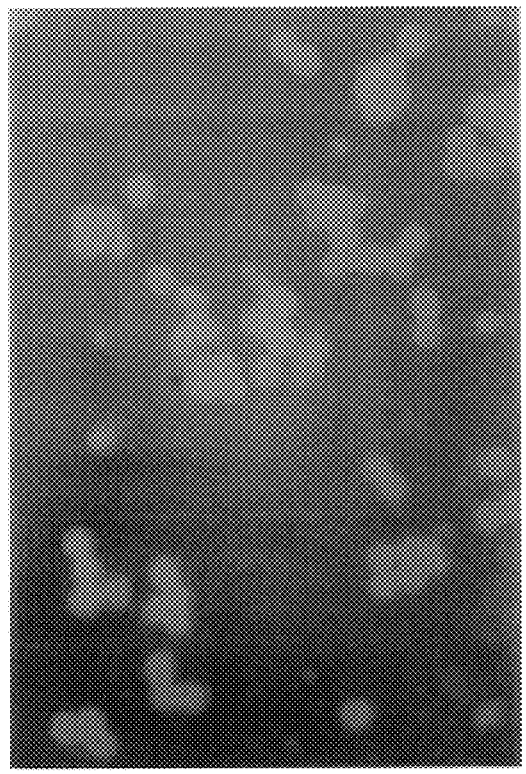
FIG. 20 is a photograph of the epifluorescence microscopic emissions with a WG cube having an excitation range of 510 nm–550 nm with cells seen under a 10×objective lens.
Figure 21:
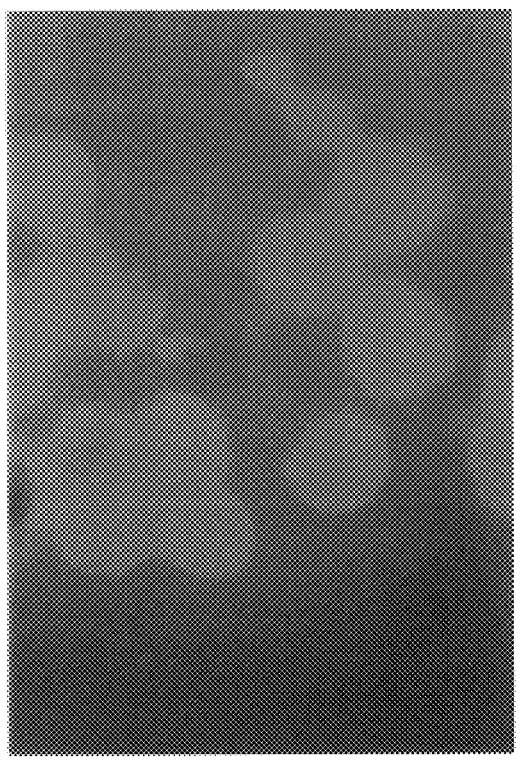
FIG. 21 is a photograph of the epifluorescence microscopic emissions with a WG cube having an excitation range of 510 nm–550 nm with cells seen under a 40×objective lens.
Figure 22:
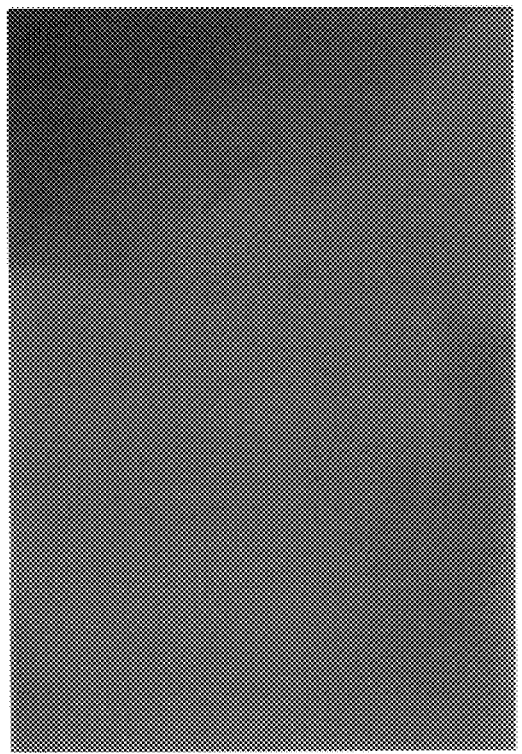
FIG. 22 is a photograph of the epifluorescence microscopic emissions with a WG cube having an excitation range of 510 nm–550 nm with cells seen under a 100×oil immersion objective lens.
Figure 23:
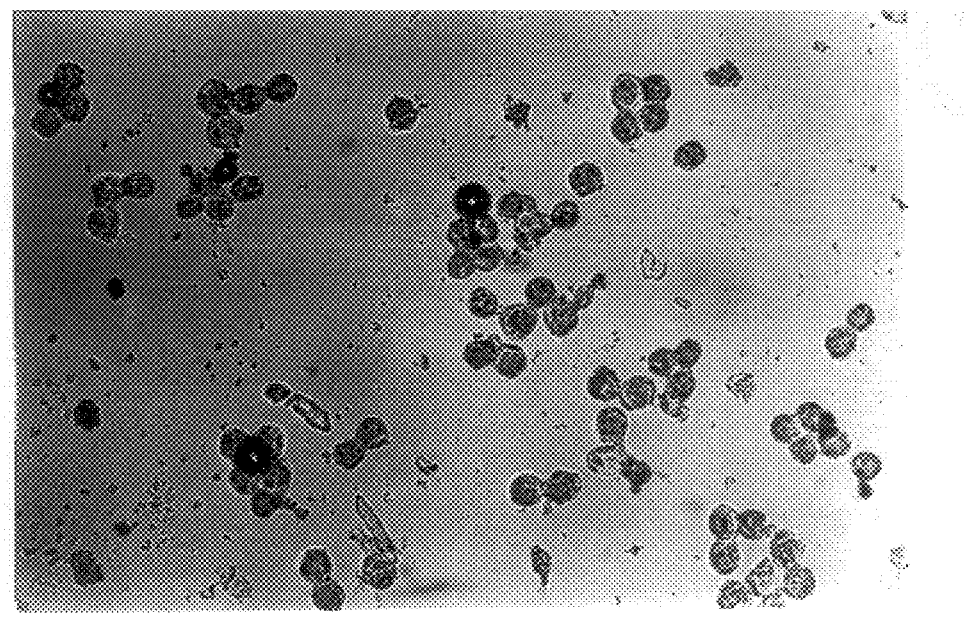
FIG. 23 is a photograph of cells seen through bright field under a 10×objective lens showing a phase contrast effect and hues of grey.
Figure 24:
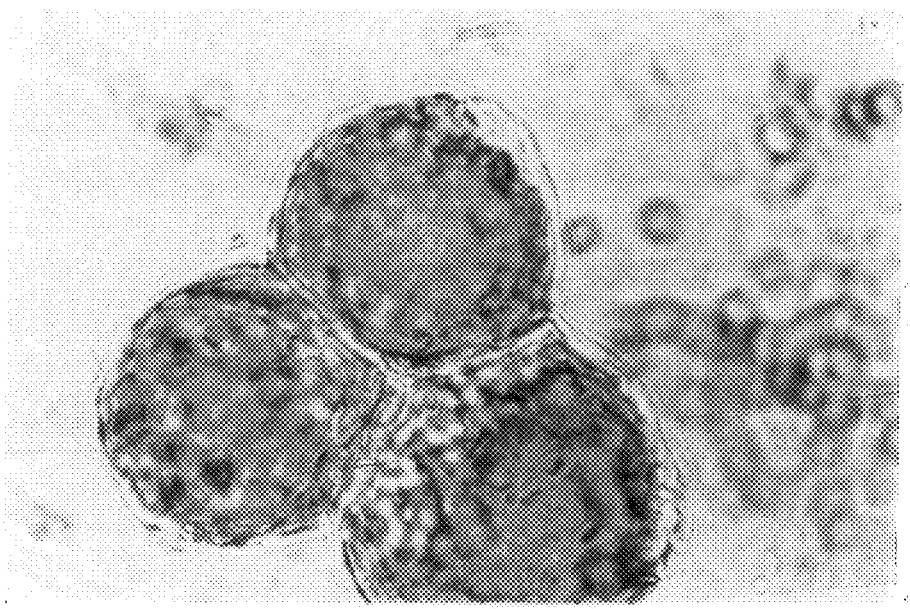
FIG. 24 is a photograph of cells seen through bright field under a 100×oil immersion objective lens.

In another embodiment, a Whatman number 1 filter paper is soaked in the extract of the dye and observed under a UV transilluminator with UV bulbs in the 260 nm–280 nm wavelength range. (See FIGS. 9 and 10). In FIG. 9, the lower section is the control (i.e., no dye extract). The lower filter paper in FIG. 10 is the control without the dye. Blue fluorescence was emitted.

In yet another embodiment, epifluorescence microscopic studies are made by using the dye as a stain in dilutions of 1:10000 (1 gm per 10 liter) and recording emissions of light when excited by different cubes. The light emissions are compared to the color hues of known fluorochromes.

Different stains are used for different excitation cubes of the fluorescent microscope. For example DAPI (DNA staining, emits blue color) and Fluorescein (dUTP; Hoechest 33258, 33342) are seen under excitation with 330 nm–385 nm excitation cubes; FITC, acridine orange (for DNA, RNA emits greenish/yellowish hues), auramine is seen under 450 nm–480 nm excitation cubes and Rhodamine, TRITC and Propidium iodide (DNA, emits orange hues) are seen under 510 nm–550 nm excitation cubes.

In one embodiment, epifluorescence microscopic screening of the cytogenetic slides was accomplished by putting a drop of the diluted extract on a slide and exciting the extract with a WU filter having a spectral range of 330–385 nm wavelengths. Blue fluorescent emissions were observed. (See FIGS. 11–14).

In another embodiment, epifluorescence microscopic screening of the cytogenetic slides was accomplished by placing a drop of the extract onto a slide and exciting the extract with a WB filter having a spectral range of 450 nm–480 nm wavelengths. Greenish yellow fluorescent emissions were observed. (See FIGS. 15–18).

In a further embodiment, epifluorescence microscopic screening of the cytogenetic slides was accomplished by putting a drop of the extract onto a slide and exciting the extract with a WG filter having a spectral range of 510 nm–550 nm wavelengths. Hues of orange fluorescent emissions were observed. (See FIGS. 19–22).

In yet another embodiment, epifluorescent microscopic screening of the cytogenetic slides under Bright Field objective was accomplished using this dye by transmitted light.

In yet another embodiment, epifluorescence microscopic screening of the cytogenetic slides stained with the dye was accomplished by observing hues of the fluorescence color emitted by the respective excitations.

In a further embodiment of the invention, excitation of the extract with a WU filter in the 330 nm–385 nm range emitted fluorescence in the 380 nm–400 nm range.

In another embodiment the excitation with a WB filter having a spectral range of 450 nm–480 nm emitted fluorescence in the 550 nm–570 nm range.

In yet another embodiment, the excitation with the WG filter having a spectral range of 510 nm–550 nm emitted fluorescence in the 600 nm–650 nm range.

In another embodiment, epifluorescent microscopic screening of the cytogenetic slides under Bright Field by using transmitted light emitted light in the full white range of the visible spectra depending upon the density of the cell ingredients and giving a phase contrast effect.

In yet another embodiment of the invention, microphotography of emitted fluorescence in the areas of slides without cells under a WU 330 nm–385 nm range was done with Kodak film of 400 ASA speed with an exposure varying from 50 seconds to 60 seconds. Hues of blue fluorescence were emitted.

In another embodiment of the invention, microphotography of emitted fluorescence in the areas of slides without cells under a WB 450 nm–480 nm range was done with Kodak film of 400 ASA speed with an exposure varying from 50 seconds to 60 seconds. A hue of yellow fluorescence was emitted.

In another embodiment in the invention, microphotography of emitted fluorescence in the areas of slides without cells under a WG 510 nm–550 nm range was done with Kodak film of 400 ASA speed with an exposure varying from 50 seconds to 60 seconds. A hue of orange fluorescence was emitted.

In another embodiment of the invention, microphotography of emitted fluorescence in the areas of slides without cells under Bright field emitted hues of grey.

In another embodiment of the invention, microphotography of emitted fluorescence in the areas of slides with cells under a WU 330 nm–385 nm range was done with Kodak film of 400 ASA speed with an exposure varying from 50 seconds to 60 seconds. A hue of blue fluorescence was emitted.

In another embodiment of the invention, microphotography of emitted fluorescence in the areas of slides with cells under a WB 450 nm–480 nm range was done with Kodak film of 400 ASA speed with an exposure varying from 50 seconds to 60 seconds. A hue of yellow fluorescence was emitted.

In another embodiment of the invention, microphotography of emitted fluorescence in the areas of slides with cells under a WG 510 nm–550 nm range was done with Kodak film of 400 ASA speed with an exposure varying from 50 seconds to 60 seconds. A hue of orange fluorescence was emitted.

In another embodiment of the invention, microphotography of emitted fluorescence in the areas of slides with cells under Bright field emitted a hue of grey.

In yet another embodiment of the invention, the 1:10000 dilution of the dye, when prepared in distilled water and used as a stain, colored fluorescent emissions occurred in the UV and visible ranges of the epifluorescence microscope.

In still another embodiment, the dye is diluted with water in the ratio 1:40000. This gives fluorescence of three colors at three different wavelengths.

In yet another embodiment, the invention provides a bioactive composition containing an extract obtained from the marine sea cucumber *Holothuria scabra* in the ratio of 1:40,000 in ultrapure water to obtain fluorescence of three colors at three different wavelengths and a phase contrast effect under transmitted light.

The invention also provides a composition that includes a bioactive extract obtained from the marine sea cucumber *Holothuria scabra* together with conventional additives. The composition is useful for the preparation of a flexible polyvinyl chloride film that exhibits fluorescent colors.

In an embodiment of the invention, a composition that includes a bioactive extract obtained from the marine sea cucumber *Holothuria scabra* together with conventional additives is provided. This composition is useful in the preparation of coating compositions and inks.

In another embodiment, the invention provides a composition that includes a bioactive extract obtained from the marine sea cucumber *Holothuria scabra* together with conventional additives and which is useful in the detection of leaks.

In yet another embodiment the invention provides a composition that includes a bioactive extract obtained from the marine sea cucumber *Holothuria scabra* together with conventional additives. This composition is useful in undersea probes.

In still another embodiment of the invention, a composition including a bioactive extract obtained from the marine sea cucumber *Holothuria scabra* together with conventional additives is provided which is useful in photochemotherapy of skin cancers.

In yet another embodiment of the invention, a cosmetic composition comprising a bioactive extract obtained from the marine sea cucumber *Holothuria scabra* together with conventional additive is provided.

In yet another embodiment, the invention provides a composition including a bioactive extract obtained from the marine sea cucumber *Holothuria scabra* together with conventional additives and which is useful as a fluorescent probe in in situ hybridization kits for molecular diagnosis.

In yet another embodiment of the invention, a composition including a bioactive extract obtained from the marine sea cucumber *Holothuria scabra* together with conventional additives and which is useful as a component of non-radioactive labeling and detection kits of biochemistry, cell biology, immunochemistry, and molecular biology is provided.

In yet another embodiment of the invention, a composition that includes a bioactive extract obtained from the marine sea cucumber *Holothuria scabra* together with conventional additives is provided. The composition is useful in immunofluorescent detections.

In yet another embodiment, the invention provides a composition that includes a bioactive extract obtained from the marine sea cucumber *Holothuria scabra* together with conventional additives and which is useful as a counterstain of DIG-labeled oliogonucleotide probes and anti-DIG Fab-fragments.

In yet another embodiment of the invention, a composition including a bioactive extract obtained from the marine sea cucumber *Holothuria scabra* together with conventional additives is provided. The composition is useful in single and multiple cell quantitative fluorescence in flowcytometry.

In yet another embodiment, the invention provides a composition that includes a bioactive extract obtained from the marine sea cucumber *Holothuria scabra* together with conventional additives and which is useful as fluorochrome stains for epifluorescence microscopy.

In yet another embodiment, the invention provides a composition that includes a bioactive extract obtained from the marine sea cucumber *Holothuria scabra* together with conventional additives and which is useful for a quick check of biocontamination in the health food industry, cosmetic industry, pharmaceutical industry and chemical industry.

In yet another embodiment, the invention provides a composition that includes a bioactive extract obtained from the marine sea cucumber *Holothuria scabra* together with conventional additives. The composition is useful for rapid estimations of biocontaminants in laboratory cultures.

In yet another embodiment of the invention, a composition is provided that includes a bioactive extract obtained from the marine sea cucumber *Holothuria scabra* together with conventional additives. The composition is useful for a rapid check of biopollutants under field conditions.

In yet another embodiment, the invention provides a composition that includes a bioactive extract obtained from the marine sea cucumber *Holothuria scabra* together with conventional additives and which is useful as a competitive inhibitor of cholinesterases.

In yet another embodiment of the invention, a composition that includes a bioactive extract obtained from the marine sea cucumber *Holothuria scabra* together with conventional additives and which is useful in antimicrobial compositions is provided.

In yet another embodiment of the invention, a composition is provided that includes a bioactive extract obtained from the marine sea cucumber *Holothuria scabra* together with conventional additives. The composition is useful as a biosurfactant in toiletry compositions.

In yet another embodiment, the invention provides a composition that includes a bioactive extract obtained from the marine sea cucumber *Holothuria scabra* together with conventional additives and which is useful as a natural colorant.

This invention pertains to the process of extraction, purification, and characterization of a new pigment which is a natural dye from an echinoderm (Holothuroidea: *Holothuria scabra*) that is widely distributed along the central west coast of India and Indo-Pacific regions of the world.

The invention further provides a novel fluorescent pure dye from the skin pigment of the animal which can be extracted 3–4 times from the same specimen by storing under −20° C., thereby reducing over-exploitation of natural resources.

The present invention also contemplates that the dye has three colored fluorescent emissions at three different excitation wavelengths of UV and visible light spectra equivalent to emissions by three different fluorochromes (DAPI, FITC, and PI) currently sold in the market for fluorescent microscopy. Thus, the dye can be commercialized as a three-in-one fluorochrome dye of epifluorescence microscopy for single and double staining of chromosomes, cells, and tissues following simple protocols.

The present invention also contemplates the use of the dye in non-radioactive labeling of proteins and DNA and RNA probes for fluorescent in siti hybridization applications in molecular biology. Thus, in a preferred embodiment of the invention, the dye can be a component of molecular labeling and detection kits. These labeling kits are widely sought after for molecular diagnostics using rapid molecular cytogenetic and microarray techniques.

In yet another preferred embodiment, the dye can be advantageously used in making cosmetic compositions for absorption of UVB from sunlight.

One particular advantage of the dye is that its fluorescence is visible even in very dilute solutions (e.g., 1:40000). This property of the dye can be utilized in life saving devices, such as a component of life jackets or to mark the location of crashed aircraft, in life rafts, as a component in military equipment, such as, for example, rockets, and leaking checks in industries.

The invention would be useful for quantitative measure of fluorescence in a flowcytometer for single and multiple cells.

The invention would also be advantageous for quick estimations of biocontaminants in natural and controlled environments such as tissue cultures, pollution, and industrial contaminations in the health, food and cosmetic industries.

The ability of the dye to emit fluorescence in the UVA range when excited with lower wavelengths of UV irradiation is useful for selective photochemotherapy of skin cancers.

In another preferred embodiment, the dye can be used as a component of sunscreen compositions in the cosmetic industry. The dye is a biosurfactant and can also be used in antimicrobial toiletry and compositions.

In another preferred embodiment, the dye has a long shelf life at room temperature as checked by fluorescent spectrophotometric analysis.

In a yet another preferred embodiment, the fluorochromes present gives natural color to cosmetics and save expenses on color additive.

The fluorescent dye can also be used as a component of novel remote sensing devices and undersea probes where light wavelength sensitivity based data is required.

The invention is illustrated by the following examples which should not be construed as limitations on the inventive scope of the invention in any manner.

EXAMPLES

The methods of extraction, partial purification, characterization of the dye, and the details of the experiments performed to check the fluorescent effects of the dye by spectroscopic analysis and epifluorescence microscopy are disclosed.

Example 1

Collection of the Material

Subkingdom: Metazoa

Phylum: Echinodermata

Sub-Phylum: Eleutherozoa

Class: Holothuroidea

Subclass: Dendrochirotacea

Order: Dendrochirota

Genus: Holothuria

Species: *scabra*

The animals belonging to *Holothuria scabra* were collected from the shores of the central west coast of India during low tide. These animals were brought to the laboratory and maintained in glass tanks containing sea water of salinity 30–32 per par (30%) for taxonomic identification and further use. The animals were adult and sexually mature.

Example 2

Extraction of the Pigment

Two methods were conducted.

Figure 2:
FIG. 2 is a photograph of a sea cucumber *Holothuria scabra* after a fourth extraction of the dye.

1) In the first method, the animal were frozen at −20° C. after collection, and when thawed, partial pigment came out in the tray. The partial pigment was processed and this way from one animal 3–4 times pigment could be removed. FIGS. 1 and 2 show the fresh animal and the animal after 4 extractions.

2) In the second method, the animals were first washed with tap water and then washed with Milliq water (i.e., ultrapure water). The body was cut open with sharp scissor and the body wall was separated from the other viscera. Epidermal skin portion was peeled off from the body wall with the help of sharp razors. The skin was stored in a −20° C. refrigerator if it was not processed immediately. The skin was then placed in a beaker and a 50% vol/vol ethanol alcohol and MQ water mixture was added to it in the following ratio: 15 gm animal skin: 250 ml of 50% ethanol alcohol.

Example 3

Filtration of the Pigment Solution

This step was performed to remove the debris of cells and some of the suspended and precipitated impurities. The solution was centrifuged so as to make a clear solution and precipitate down all suspended things.

The colored solution was then decanted and filtered with a microfiltration unit (Vensil make) glass filter with the help of a peristaltic pump. The filtrate was placed on an orbital shaker and left for half an hour at a rotation of 200 rpm.

Example 4

Concentration of the Pigment

The colored solution was then placed on a water bath at 80° C. and concentrated to one-third of its volume. This evaporated any alcohol present. The concentrate was then again subjected to filtration with the same filtering apparatus.

Example 5

Purification of the Dye

The pigment solution contained impurities such as NaCl, $MgCl_2$, $MgSO_4$, and other water soluble compounds. It was noted that polar organic solvents such as alcohol (dehydrated), acetone, if added to the concentrated solution of pigment, will rapidly be precipitated. It can then be separated from the sea water salts. This step is done to purify the pigment for spectroscopic analysis.

The concentrated solution prepared as described above was taken in a separating funnel of 500 ml and to this was added ethanol (80 ml of concentrated supernatant+100 ml of 99.5% ethanol). The separating funnel was titled to gently mix the contents. The precipitate was collected overnight. The concentrate with the precipitate was centrifuged at 1500 rpm for 4–5 minutes and the top layer was decanted. The precipitate was then dissolved in 5 ml of MQ water and 100% ethanol was added until the precipitation was complete. This solution was centrifuged and the precipitate was collected. This step was repeated 3–4 times to purify the pigment.

The precipitate was evaporated to dryness on a water bath at 80° C. for 5 minutes. The pure dye was scooped out with the help of a spatula and stored in a dry glass vial at room temperature.

250 ml of 50% ethanol crude extract from Example 2 provided 2.5 gms of partially purified dye in a powder form upon evaporation.

Example 6

Physical Characteristic of the Compound

The crude extract was yellowish green in color. The physical nature of the pure dried dye when recorded with the naked eye was reddish brown in color in daylight. Under tube light, a hue of green was observed. The dye was soluble in water and insoluble in organic solvents such as pure ethanol, methanol, and acetone. It was amorphous in nature, with a pH of 6.5, and had a negative charge.

Example 7

Structural Analysis of the Dye by Chemical Methods

Experiment 1:

CHNS elemental analysis of the dye was performed. The results are shown in Tables 1(a) and (b) set forth below.

Experiment 2:

The dye was dissolved in MQ water at 2 mg/ml and checked for chemical nature. The presence and absence of certain groups was tested and the results are given in Table 2. Whenever a test showed negativity, a higher concentration of dye was used and the experiment was performed again. For example, to 2 mg/ml solution of dye β-mercaptoethanol (reducing agent) was added. No decoloration of the compound occurred. This proved that a quinonoid ring is absent and the pigment is a dye.

Experiment 3:

A concentrated dye solution at 10 mg/ml was heated and no precipitation or coagulation was observed. This proved that the compound is non-proteinaceous in nature.

Experiment 4:

A drop of concentrated HCl and Fehling's solution was added to the same solution of Experiment 3. No color change proved that a reducing sugar is absent.

Example 8

Checking the Electric Charge of the Dye

The charge of the compound was determined by gel electrophoresis. In particular, dye samples (10 ml) were loaded in a 1% agarose gel prepared with 0.5×TBE. The gel was allowed to run for an hour at 65 volts. It was then removed from the gel casting system and observed by the naked eye as well as under a UV transilluminator. It was discovered that the dye was moving towards the positively charged electrode. Therefore, the dye itself is a negatively charged compound.

Example 9

Biosurfactant Analysis

The biosurfactant nature of the dye was observed by its making a foam while added to water and shaken. The solution gave feeling of soapiness.

Example 10

Antimicrobial Test

Because the marine dye is a phenolic compound, and phenolic compounds generally have antimicrobial activity, an antimicrobial assay was performed with this compound and the zone of inhibition was observed.

*E. coli* (wild type) culture was grown overnight in Mac-Conkey's broth 50 ml in a conical flask (100 ml). Antibiotic assay agar medium was prepared and sterilized. It was then brought to a temperature of 50° C. and 1 ml of *E. coli* (wild type) culture was added to it. The culture was mixed with the antibiotic assay agar medium and was allowed to solidify. 10 mg/ml of the sample was prepared and soaked in filter paper disks. It was then placed upon the antibiotic assay agar medium seeded with *E. coli*

The sample/agar medium was then incubated at 37° C. in an incubator for 24 hours. A zone of inhibition surrounding the filter disk was observed. This experiment proved that the dye had antimicrobial activity against gram negative organisms like *E. coli*.

Example 11

UV/Visible Spectroscopy of the Dye

Instrument used: Genesys2 UV spectrophotometer.

2 mg/10 ml solution was prepared in a volumetric flask and spec readings were taken in the UV visible range using a quartz cuvette and adding 2 ml of the solution. The control was ultrapure water.

UV visible spectroscopy from 300 nm–700 nm wavelength was performed. The peaks were marked at 379 nm and 439 nm wavelengths. The UV visible spectroscopy from 250 nm–350 nm wavelength was performed. The peaks were marked at 272 nm and 299 nm wavelength. (See FIGS. 3A–3C and 4A–4B).

Example 12

Fluorescence Spectroscopy of the Dye

Apparatus used: Hitachi fluorescence spectrophotometer.

Fluorescence spectroscopy was performed at different wavelength ranges of the visible and UV spectra and emission ranges were noted. It was found that with a excitation wavelength of 270 nm, fluorescence occurred at 324–380 nm with maximum intensity. (See FIG. 5).

In fluorescence spectroscopy with an excitation wavelength of 450 nm, fluorescence occurred at 500–580 nm with maximum intensity. (See FIG. 6).

Figure 8:
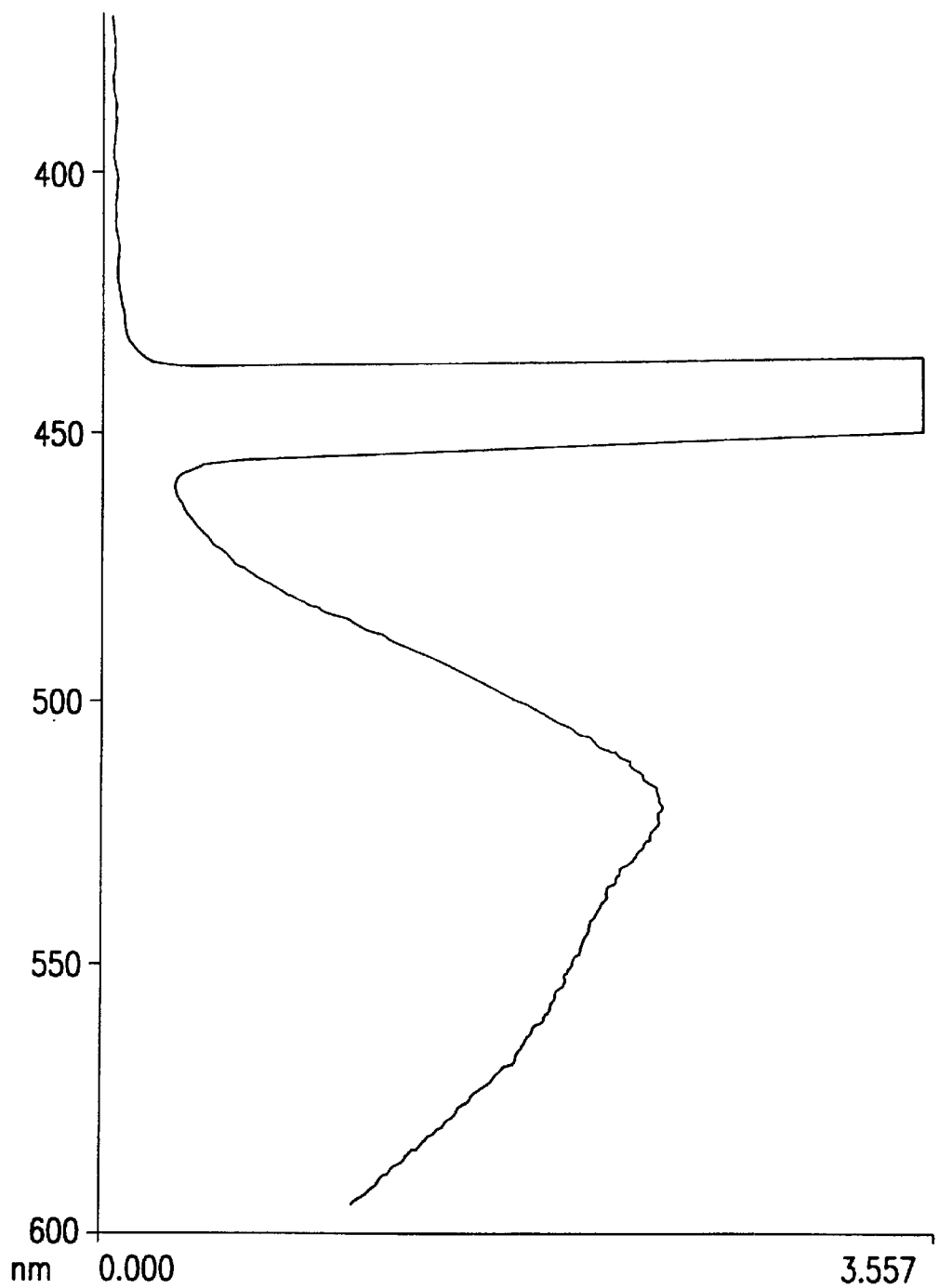
FIG. 8 is a graphical illustration of fluorescence spectroscopy of the extract at an excitation wavelength of 270 nm.

In fluorescence spectroscopy with an excitation wavelength of 540 nm, fluorescence occurred at 500–620 nm with maximum intensity (see FIG. 7) and fluorescence spectroscopy with an excitation wavelength of 555 nm, fluorescence occurred at 575–620 nm with maximum intensity (see FIG. 8).

Example 13

Physical Checking of Emission under a UV Transilluminator and Gel Documentation System A Whatman No. 1 filter paper was cut and dipped in the diluted crude extract and viewed under a gel doc UV light. It was clearly seen that as the dye progressed, seeping in the fluorescence area progressed further. (See FIG. 9).

In another test, the filter papers used for filtration were viewed under a UV transilluminator with 260–280 run UV range bulbs. A bluish green hue fluorescence was noticed. (See FIG. 10).

Example 14

Epifluorescence Microscopy

Epifluorescence microscopic studies were made by using this dye as a stain in dilutions of 1:40000 and recording emissions of light when excited by different cubes and then comparing the color hues obtained with the known fluorochromes. Cytogenetical air-dried preparations of a fixed tissue was made. To this, a drop of the stain was added and a coverslip was placed on top. The screening was done using excitations of UV light and visible light spectra by WU, WB, and WG cubes of the Olympus reflected light.

WU cube's wavelength range was 330 nm–385 nm.

WB cube's wavelength range was 450 nm–480 nm.

WG cube's wavelength range was 510–550 nm.

Example 15

Emission ranges at different excitation ranges were determined. It was noted that excitation with the WU filter at a 330 nm–385 nm range emitted fluorescence in the 380 nm–400 nm range; excitation with the WB filter having a spectral range of 450 nm–480 nm emitted fluorescence in the 500 nm–570 nm range; and excitation with the WG filter having a spectral range of 510–550 nm emitted fluorescence in the 570 nm–650 nm range.

Epifluorescent microscopic screening of the cytogenetic slides under Bright Field using transmitted light emitted light in the full white range of the visible spectra and depending upon the density of the cell ingredients, gave hues of gray a phase contrast like effect.

Example 16

Fluorescent Color Emitted

The hues of colors emitted were noted in the areas where only the dye was present and at places where some specimens were present. The excitation spectral range and the emitted fluorescence strictly followed the Stoke's law. (See Table 3).

Example 17

Microphotography of the Slides with the Dye Used as Epifluorescence Microscopy Stain The microphotography of emitted fluorescence in the areas of slides without cells and with specimen cells under WU 330 nm–385 nm range, WB 450 nm–480 nm range, WG 510–550 nm range, and Bright Field was accomplished by using Kodak film of 400 ASA speed with an exposure varying from 50 to 60 seconds. The results are shown in FIGS. 11–24.

Example 18

Stability Check

The dye is stable and remains active at room temperature and remains like that up to 120° C. This stability was proven because there was no alteration of the spectral property after such a treatment. The compound retained its stability for about a year without any contamination or chemical decay. Further the marine dye did not undergo photolysis after light treatment. Thus, the marine dye does not require stabilizing agents.

Example 19

Pesticidal Effect

It was determined that the compound was toxic to insects. For example, it showed toxicity to insects like ants. The filter paper soaked in the dye was left unattended on the work bench. The next day the filter paper was full of dead ants.

Example 20

The dye was tested on cell lines and activity was observed.

Example 21

Staining with the Dye

The fixed tissue with glacial acetic acid and methanol from different sources were taken on the slide and the dye solution was added to it without pretreatment. It was observed that different parts of the cell were taking the dye solution differently. For example, the nucleus became stained because of the staining of arginine and leusine rich proteins present in the nucleus (ex, histone). The other cell organellae also became stained. Because the marine dye stained the proteins of the chromosomes, it has an added value in studying the karyotype of the cell.

Example 22

The bioactive extract of the dye was placed in a microfuge tube and kept at −20° C. and viewed in the frozen state under UV light. In another experiment, the later dipped in the dye solution was held at −20° C. and observed under a UV transilluminator.

Example 23

The extract was used as a veterinary remedy for killing ticks/fleas of dogs. It was determined that 1:200 times dilutions of the crude extract killed ticks and fleas in less than 40 seconds.

TABLE 1 (a)

Structural analysis of the dye by a chemical method for determining the presence/absence of a quinonoid ring, phenolic, and amine group.

| Experiment | Observation | Inference |
| --- | --- | --- |
| 2 mg/ml of water sample + β-marcaptoethanol | No decoloration | Quinonoid ring absent |
| 2 mg/ml of water sample + neutral FeCl$_3$ | Purple coloration | Phenolic ring is present |
| 2 mg/ml of water sample + 0.1 N HCl + NaNO$_2$ in cold added to alkaline solution of β-naphthol (Diazotization and then β-naphthol addition) | No precipitate formed | No aromatic amine group present |

NOTE:
The tests which gave negative results were repeated by taking a solution of higher concentration.

TABLE 1 (b)

Elemental analysis of the fluorescent dye.

| 1. | Carbon, % | 8.3629 |
| --- | --- | --- |
| 2. | Hydrogen, % | 1.7430 |
| 3. | Nitrogen, % | 0.8368 |
| 4. | Sulfur, % | 9.4521 |

TABLE 2

Structural analysis of the dye by a chemical method for checking its proteinaceous/non-proteinaceous nature and presence/absence of a reducing sugar.

| Experiment | Observation | Inference |
| --- | --- | --- |
| Heat a conc. solution (5–10 mg/ml) | No precipitation or coagulation | Non-proteinaceous compound |
| 2 mg/ml of water sample β-marcaptoethanol | No color change | Quinonoid ring is absent |

NOTE:
The tests which gave negative results were repeated by taking a solution of higher concentration.

TABLE 3

Colors of the different colored fluorescence of the dye used as stain when excited with different wavelength cubes of the Olympus epifluorescence microscope.

| Name of the fluorescent cube as given in the catalogue | Excitation range of the cube | Emission range of fluorescence | *Color of the fluorescence |
| --- | --- | --- | --- |
| WU | 330–385 nm | 380–400 nm | Blue |
| WB | 450–480 nm | 550–570 nm | Yellow |
| WG | 510–550 nm | 600–650 nm | Orange |
| Bright Field | Transmitted light | Visible range | Grey |

*NOTE:
The microphotographs of these colors gave hues of the adjacent spectrum. For example, blue came as greenish hue, yellow came as greenish yellow, orange came as reddish orange, whereas while observing, the colors were clear blue, yellow and orange fluorescence.

ADVANTAGES OF THE DYE ACCORDING TO THE PRESENT INVENTION OVER THE PRESENT MARKETED DYES

1. The dye is non-radioactive as it is a dye from a natural source and is not synthetic.
2. This dye in its single form is equivalent to three different synthetic fluorochromes giving the same emission of fluorescent colors.
3. The dye can be used as a quick microscopic stain giving a phase contrast effect without any extra expenses on the phase contrast accessories of a microscope and without any lengthy protocols of fixations and preservations of specimens. Especially useful for an on-the-spot quality check of live samples.
4. Being non-degradable in quality of fluorescence for longer durations, it does not require refrigeration while exporting. The presently marketed fluorescent dyes are exported under refrigeration which is equivalent to −20° C.
5. Unlike the earlier known Green Fluorescent Protein (GFP) from a marine jelly fish, the dye is not a reporter gene. The results are direct. GFP absorbs blue light at 395 nm with a minor peak at 470 nm which emits green light. The dye of the present invention emits three fluorescent color at three different fluorescent wavelengths. The dye is soluble in water, so it can be used in components where water soluble dyes are needed. The dye is insoluble in organic solvents such as ethanol, methanol, and acetone.
6. The dye is negatively charged.
7. The dye has a pH of 6.5, which is almost neutral, and therefore will not effect the final properties of pH drastically in compositions.
8. The dye is non-proteinaceous in nature and is therefore non-degradable under natural conditions.
9. The dye has the nature of a biosurfactant, so it can be used in soaps and toiletry compositions.
10. The dye has antimicrobial qualities.
11. The dye emitted fluorescence colors even at a dilution range of 1:40000 times (i.e., 1 gm powder of dye dissolved in 40 liters of ultrapure water). The fluorescence of the extract persisted even after 1 year at room temperature. These multicolored emissions of the dye at different wavelengths of excitations are comparable to fluorochrome microscopic stains already in the market.

12. The blue colored fluorescence of the present dye is comparable to the emission of the same color by a DAPI fluorochrome at the same wavelength excitation, used as components of the non-radioactive labeling kits of biochemistry, cell biology, immunochemistry, and molecular biology.
13. The blue colored fluorescence of the present dye is also comparable to the emission of color by Hoechest 33258 used as components of the non-radioactive labeling and detection kits of biochemistry, cell biology, immunochemistry, and molecular biology.
14. The blue colored fluorescence of the present dye is also comparable to the emission of color by a Hoechest 33342 fluorochrome at the same wavelength excitation used as components of the non-radioactive labeling and detection kits of biochemistry, cell biology, immunochemistry, and molecular biology.
15. The yellow colored fluorescence of the dye in the visible range is comparable to the same colored emissions of acridine orange used as components of the non-radioactive labeling and detection kits of biochemistry, cell biology, immunochemistry, and molecular biology.
16. The yellow colored fluorescence of the dye in the visible range is comparable to the same colored emissions of auramine used as components of the non-radioactive labeling and detection kits of biochemistry, cell biology, immunochemistry, and molecular biology.
17. The yellow colored fluorescence of the dye in the visible range is comparable to the same colored emissions of FITC used as components of the non-radioactive labeling and detection kits of biochemistry, cell biology, immunochemistry, and molecular biology.
18. The orange colored fluorescent emission is comparable to the orange fluorescence color of a propidium iodide fluorochrome used as components of the non-radioactive labeling and detection kits of biochemistry, cell biology, immunochemistry, and molecular biology.
19. The orange colored fluorescent emission is comparable to the orange fluorescence color of a Rhodamine fluorochrome used as components of the non-radioactive labeling and detection kits of biochemistry, cell biology, immunochemistry, and molecular biology.
20. The orange colored fluorescent emission is comparable to the orange fluorescence color of a TRITC fluorochrome used as components of the non-radioactive labeling and detection kits of biochemistry, cell biology, immunochemistry, and molecular biology.
21. Unlike the synthetic commercial dyes used for the same purposes, the present dye is stable at room temperature and has a long shelf life. Molecular non-radioactive kits of the dye can be exported at room temperature.
22. The dye of the present invention has characteristics of at least one hundred and twenty three different fluorochromes in the market (DAPI, Hoechest 33258, Hoechest 33342, FITC, acridine orange, auramine, rhodamine, TRITC, propidium iodide, etc.). Under the ordinary light of a microscope, the hues of grays produce a phase contrast effect which is useful in the rapid screening of cytogenetical, cytological, and histochemical slides and save the expenses on an extra phase contrast accessory component of the microscope. The fluorescence color emissions follow Stoke's law of fluorescence.
23. The microphotographs with Kodak film shows hues of the adjacent color emission wavelengths. For example, when blue color fluorescence under an epifluorescence microscope is observed in the microphotograph, hues of green are also observed.
24. The microphotographs with Kodak film shows hues of the adjacent color emission wavelengths. For example, when yellow color fluorescence under an epifluorescence microscope is observed, in microphotograph, hues of green are also observed. When orange fluorescence color under the epifluorescence microscope is observed in microphotograph, hues of red are also observed.
25. The cytogenetic slides seen under all fluorescence gives a counterstain effect of cells with the background where no specimen but only dye is present.
26. The dye can be used for the preparation of a polyvinyl chloride film that exhibits fluorescent colors. It also can be used in fluorescent colors in a variety of paints, inks, textiles, etc.
27. The dye can be used in compositions of fluorescent dye for bleaching and brightening polymer. The dye can also be used in leak detection with a full spectrum fluorescent dye. It can also be used in an automated chemical metering system. In addition, it can be used to mark the location of crashed aircrafts, life crafts, and equipment, such as, for example, rockets. Further, the dye can be used in undersea probes. The dye can also be used in photochemotherapy of skin cancers.
28. The dye can be used as a chromatophore sunscreen component of cosmetics creams and lotions.
29. The water miscible quality of the dye makes it easily miscible in moisturizers. It can be used as a fluorescent in situ hybridization application kit component for molecular diagnostics. It can also be used as a component of the non-radioactive labeling and detection kits of biochemistry, cell biology, immunochemistry, and molecular biology for labeling of DNA, RNA, proteins, and enzymes. The dye can be used in immunofluorescent detections, counterstain of DIG-labeled oliogonucleotide probes, and anti-DIG Fab-fragments, single and multiple cell quantitative fluorescence in flowcytometry, and fluorochrome stains for epifluorescence microscopy.
30. Th dye can be used for a quick check of biocontamination in the health food industry, cosmetic industry, pharmaceutical and chemical industries, for rapid estimations of biocontaminants in laboratory cultures, and for a rapid check of biopollutants under field conditions. It can also be a competitive inhibitor of cholinesterases.
31. The dye can be used in antimicrobial compositions.
32. The dye can be used as a biosurfactant in toiletry compositions.
33. The dye can be used as a natural colorant. A bioactive composition of the marine dye in the ratio of 1:40000 in ultrapure water obtains fluorescence of three colors at three different wavelengths and a phase contrast effect under transmitted light.
34. Purification of the dye can be done in 250 ml of 50% ethanol crude extract when evaporated on a water bath at 80° C. for 5 minutes to provide 2.5 gms of purified dye in a powder form. A 2 mg/10 ml solution composition is used for spectrophotometry. A 10 mg/ml solution was used for the structural analysis of the dye using a chemical method. A bioactive composition of the dye in the ratio of 1:40000 times dilutions with water as the binder gives fluorescence of three colors at three different wavelengths.

What is claimed is:

1. A natural fluorescent dye obtained from an extract of a marine organism, said organism being a marine sea cucumber *Holothuria scabra* and said dye having the following characteristics:

i. the fluorescent dye is decolorized by a reducing agent,
ii. the fluorescent dye decolorized is not a synthetic compound,
iii. the crude extract of the dye is yellowish green in color,
iv. the purified dye is reddish brown colored powder when seen with the naked eye in the daylight,
v. under tube light some hues of green are emitted by said dye,
vi. the dye is amorphous in nature,
vii. the dye is soluble in water,
viii. the dye is insoluble in organic solvents,
ix. the dye is negatively charged,
x. the dye has a pH of 6.5,
xi. the dye comprises a phenolic group,
xii. the dye does not have a quinonoid ring,
xiii. the dye does not have aromatic amine groups,
xiv. the dye is non-proteinaceous in nature,
xv. reducing sugar is absent from said dye,
xvi. the dye can act as a biosurfactant,
xvii. the dye has antimicrobial qualities and when antimicrobial assay is performed, shows zone of inhibition,
xviii. pigment cum dye is a fluorescent dye and emits fluorescence when excited with different wavelengths of UV and visible spectral ranges on a spectrophotometer,
xix. UV, visible spectroscopy is from 300 nm–700 nm and the peaks are marked at 379 nm and 439 nm wavelengths for said dye,
xx. UV, visible spectroscopy from 250 nm–350 nm and the peaks are at 272 nm and 299 nm wavelengths,
xxi. fluorescent spectroscopy for said dye in the UV and visible spectra, when excited with UV 270 nm wavelength the fluorescence is emitted in the 324 nm–380 nm range, said range being within the UVA wavelength range of ultraviolet rays of sunlight,
xxii. at an excitation wavelength 450 nm in Fluorescent spectroscopy for said dye the fluorescence emission is at 500 nm–580 nm with maximum intensity,
xxiii. at an excitation wavelength 540 nm in Fluorescent spectroscopy for said dye the fluorescence emission is at 500 nm–620 nm with maximum intensity,
xxiv. with excitation wavelength 555 nm in Fluorescent spectroscopy for said dye the fluorescence emission is at 575 nm–620 nm with maximum intensity,
xxv. physical checking of Whatman Filter no. 1 dipped with dye concentration 1:40000 dilution under UV transilluminator and Gel Documentation system with UV bulbs of 260 nm–280 nm range said dye emits a bluish green hue color of fluorescence,
xxvi. the dye emits three different colored fluorescence at 3 different wavelengths of the UV and visible ranges of the fluorescent cubes of an epifluorescence microscope,
xxvii. fluorescence blue color emission occurs in the 380 nm–400 nm range of UVA when excited under ultraviolet cube WU-330 nm–385 nm excitation range for said dye,
xxviii. fluorescence yellow color emission occurs in the 500 nm–570 nm range when excited under WB cube of 450 nm–480 nm excitation range for said dye,
xxix. fluorescence orange color emission occurs in the 570 nm–650 nm range when excited under WG cube of 510 nm–550 nm excitation range for said dye,
xxx. the dye emits hues of grays under the ordinary transmitted light bulb of the epifluorescence microscope when seen under 10×objective,
xxxi. the dye emits fluorescence colors at a dilution range of at least 1:40000,
xxxii. the fluorescence of the extract persists after at least 1 year at room temperature,
xxxiii. the fluorescence of the dye is photostable and is not deteriorated by long exposures to direct light, and
xxxiv. the fluorescence of the dye does not change when frozen at 20° C.

2. A dye as claimed in claim 1 wherein the multicolored emissions of the dye at different wavelengths of excitations are comparable to fluorochrome microscopic stains already on the market.

3. A dye as claimed in claim 1 wherein the blue colored fluorescent emission of the dye is comparable to the emission of same color by DAPI fluorochrome at the same wavelength excitation.

4. A dye as claimed in claim 1 wherein the yellow colored fluorescent emission of the said dye in the visible range is comparable to the same colored emission of Auramin.

5. A dye as claimed in claim 1 wherein the yellow colored fluorescent emission of the said dye in the visible range is comparable to the same colored emissions of FITC.

6. A dye as claimed in claim 1 wherein the orange colored fluorescent emission is comparable to the orange fluorescence color of Propidium Iodide fluorochrome.

7. A dye as claimed in claim 1 wherein the orange colored fluorescent emission is comparable to the orange fluorescence color of Rhodamine fluorochrome.

8. A dye as claimed in claim 1 wherein the orange colored fluorescent emission is comparable to the orange fluorescence color of TRITC fluorochrome.

9. A dye as claimed in claim 1 wherein the dye is stable at the room temperature and has a long shelf life.

10. A dye as claimed in claim 1 wherein said dye is stable when transported at room temperature.

11. A dye as claimed in claim 1 wherein the dye is a single dye and has characteristics of at least one hundred different fluorochromes.

12. A dye as claimed in claim 11, wherein said at least one hundred different fluorochromes comprises at least one fluorochrome selected from the group consisting of DAPI, Hoechest 33258, Hoechest 33342, FITC, acridine orange, auramine, Rhodamine, TRITC, and propidium iodide.

13. A dye as claimed in claim 1 wherein said dye does not undergo loss in fluorescence upon freezing.

14. A dye as claimed in claim 1 wherein said dye when seen under bright field of fluorescent microscope, under 10×objective exhibits hues of bluish grays so as to produce a phase contrast effect useful in economic rapid screening of cytogentical, cytological, and histochemical slides.

15. A dye as claimed in claim 1 wherein under 100×oil immersion objective of an ordinary transmitted light microscope the proteins of yolk, nucleoplasm and chromatin of actively dividing cleavage cells show different colors of staining; said colors of staining comprising hues of brownish yellow for said proteins of yolk, yellow for said nucleoplasm and dark blue for said chromatin.

16. A dye as claimed in claim 1 wherein the fluorescence color emissions follow Stoke's law of fluorescence.

17. A dye as claimed in claim 1 wherein microphotographs with Kodak film rolls show hues of adjacent color emission wavelengths, said adjacent color emissions comprising blue color fluorescence under the epifluorescence.

18. A dye as claimed in claim 1 wherein the microphotographs with Kodak film rolls shows hues of the adjacent color emission wavelengths like when seen yellow color fluorescence under the epifluorescence microscope in microphotograph the hues of green also comes.

19. A dye as claimed in claim 1 wherein when seen orange fluorescence color under the epifluorescence microscope in microphotograph the hues of red also comes.

20. A dye as claimed in claim 1 wherein the cytogenetic slides seen under all fluorescences gives a counterstain effect of cells and cell components verses the background color where no specimen but only dye is present.

21. A dye as claimed in claim 1 wherein the dye is diluted with water in the ratio 1:10,000 times and this gives fluorescence of three colors at three different wavelengths.

22. A dye as claimed in claim 1 wherein the dye is diluted with water in the ratio 1:40,000 times and this gives fluorescence of three colors at three different wavelengths.

23. A dye as claimed in claim 1, wherein said organic solvents are selected from the group consisting of ethanol, methanol and acetone.

24. A dye as claimed in claim 1, wherein said UV, visible spectroscopy is from 250 nm–350 nm and the peaks are at 272 nm and 299 nm wavelengths for said dye.

25. A dye as claimed in claim 1, wherein said dye is included in a molecular or radioactive kit, said dye being stable when said kit is transported at room temperature.

26. A dye as claimed in claim 1 useful for:
  (a) preparation of flexible polyvinyl chloride film that exhibits fluorescent colors;
  (b) fluorescent colors in paints, inks, and textiles;
  (c) a composition of fluorescent dye for bleaching and brightening polymer;
  (d) leak detection with a full spectrum fluorescent dye;
  in automated chemical metering system;
  (f) to mark the location of crashed transport vessel; said vessel being selected from the group consisting of aircraft, life crafts, and rockets;
  (g) undersea probes;
  (h) photochemotherapy of skin cancers;
  (i) chromatophore sunscreen component of cosmetic creams and lotions;
  (j) the water miscible quality of the dye can make it easily miscible in moisturizers;
  (k) fluorescent in situ hybridization application kit component for molecular diagnostics;
  (l) component of the nonradioactive labeling and detection kits, said kits being used for a purpose selected from the group consisting of biochemistry, cell biology, immunochemistry, and molecular biology for labeling of DNA, RNA, proteins and enzymes;
  (m) immunofluorescent detections;
  (n) counterstain of DIG-labeled oligonucleotide probes and Anti-DIG Fab-fragments;
  (o) single and multiple flow cytometry applications;
  (p) fluorochrome stains for epifluorescence microscopy;
  (q) a quick check of biocontamination in the health food industry, cosmetic industry,
  (r) pharmaceutical and chemical industries;
  (s) rapid estimations of biocontaminants in laboratory cultures;
  (t) a rapid check of biopollutants under field conditions;
  (u) competitive inhibitor of cholinesterases;
  (v) in antimicrobial compositions;
  (w) as a biosurfactant in toiletry compositions;
  (x) a natural colorant;
  (y) a bioactive composition of the dye in the ratio of 1:40000 in ultrapure water;
  (z) to obtain fluorescences of three colors at three different wavelengths and a phase contrast effect under transmitted light; and
  (aa) various fluorescent applications to be performed in areas of sub zero temperatures.

27. A skin care composition containing the dye of claim 1 and further comprising at least one physiologically and cosmetically acceptable vehicle; said vehicle being selected from the group consisting of a diluent, dispersant and carrier.

28. A process for extraction of a natural fluorescent dye from *Holothuria scabra* sea cucumber, which comprises the steps of:
  (a) collecting said *Holothuria scabra*,
  (b) placing said *Holothuria scabra* in a seawater bath,
  (c) freezing said *Holothuria scabra* at −20° C.,
  (d) thawing said *Holothuria scabra* to obtain a pigment; and
  (e) repeating steps (c) and (d) for removal of said pigment.

29. A process as claimed in claim 28 wherein the dye is diluted with water in the ratio 1:40,000 times and emits fluorescence of three colors at three different wavelengths.

30. A process as claimed in claim 28 wherein said purification of said pigments comprises treating said pigments in proportion to 250 ml of 50% ethanol crude extract when evaporated on a water-bath at 80 degree centigrade for 5 minutes to provide 2.5 gms of partially purified dye in a powder form.

31. A process as claimed in claim 28 wherein the dye is diluted with water in the ratio 1:10,000 times and emits fluorescence of three colors at three different wavelengths.

32. A process as claimed in claim 28 further comprising assessing the physical characteristic of the dye by taking a sample of said dye in proportion to 2 mg/10 ml solution for spectrophotometry.

33. A process as claimed in claim 28 further comprising chemically analyzing said dye using a sample of said dye having a concentration of 10 mg/ml.

34. A process as claimed in claim 28, wherein said seawater bath does not require mechanical aeration.

35. A process as claimed in claim 28, wherein steps (c) and (d) are repeated 3–4 times.

36. A process as claimed in claim 28, further comprising step:
  (f) purifying said pigment.

* * * * *

UNITED STATES PATENT AND TRADEMARK OFFICE
CERTIFICATE OF CORRECTION

PATENT NO.   : 6,582,730 B2  
DATED        : June 24, 2003  
INVENTOR(S)  : Usha Goswami et al.

It is certified that error appears in the above-identified patent and that said Letters Patent is hereby corrected as shown below:

<u>Title page,</u>  
Item [75], Inventors, "Anush Ganguly, Goa (IN)" should read  
-- Anutosh Ganguly, Goa (IN) --.

Signed and Sealed this

Fourth Day of November, 2003

JAMES E. ROGAN  
*Director of the United States Patent and Trademark Office*